(12) United States Patent
Fukuyama et al.

(10) Patent No.: US 7,271,974 B2
(45) Date of Patent: Sep. 18, 2007

(54) METHOD OF SELF SERVO WRITE WITH LOW DENSITY GAS

(75) Inventors: Hiroshi Fukuyama, Kanagawa (JP); Kensuke Ishiwata, Kanagawa (JP); Kanji Nakao, Kanagawa (JP); Kazuya Takeda, Kanagawa (JP); Kazuhiko Washizu, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/191,446

(22) Filed: Jul. 27, 2005

(65) Prior Publication Data

US 2006/0023339 A1 Feb. 2, 2006

(30) Foreign Application Priority Data

Jul. 28, 2004 (JP) ............................. 2004-219798

(51) Int. Cl.
*G11B 21/02* (2006.01)
*G11B 33/14* (2006.01)
*G11B 17/08* (2006.01)
*G11B 5/596* (2006.01)

(52) U.S. Cl. .................. 360/75; 360/77.02; 360/97.02; 360/98.01

(58) Field of Classification Search ...................... None
See application file for complete search history.

(56) References Cited

U.S. PATENT DOCUMENTS

| | | | |
|---|---|---|---|
| 6,178,059 B1 * | 1/2001 | Frees | 360/75 |
| 6,785,082 B2 * | 8/2004 | Fiorvanti et al. | 360/75 |
| 6,999,262 B2 * | 2/2006 | Han et al. | 360/75 |
| 2003/0081344 A1 | 5/2003 | Fioravanti et al. | |
| 2003/0112546 A1 * | 6/2003 | Hanson et al. | 360/77.04 |
| 2003/0214748 A1 * | 11/2003 | Fioravanti | 360/75 |

FOREIGN PATENT DOCUMENTS

| | | |
|---|---|---|
| JP | 60-059660 A | 4/1965 |
| JP | 57-098164 | 6/1982 |
| JP | 05-002864 | 1/1993 |
| JP | 2001-110178 | 4/2001 |

* cited by examiner

*Primary Examiner*—William Korzuch
*Assistant Examiner*—Jason Olson
(74) *Attorney, Agent, or Firm*—Townsend and Townsend and Crew LLP; John Henkhaus

(57) ABSTRACT

Embodiments of the invention provide a disk device capable of writing highly accurate servo data using an extremely simple technique, and a manufacturing method therefor. According to one embodiment, a method for manufacturing a disk device includes: mounting a magnetic disk and each assembly for driving the magnetic disk, such as an SPM and a VCM, in a base and attaching a top cover so as to seal the enclosure (made up of the base and the top cover) with each assembly of the HDD therein; replacing the air within the hard disk assembly (HDA) with a gas having a lower density than air, such as He; writing servo data to the magnetic disk in a self servo track write operation; and replacing the gas within the HDA with air.

22 Claims, 28 Drawing Sheets

Fig.4
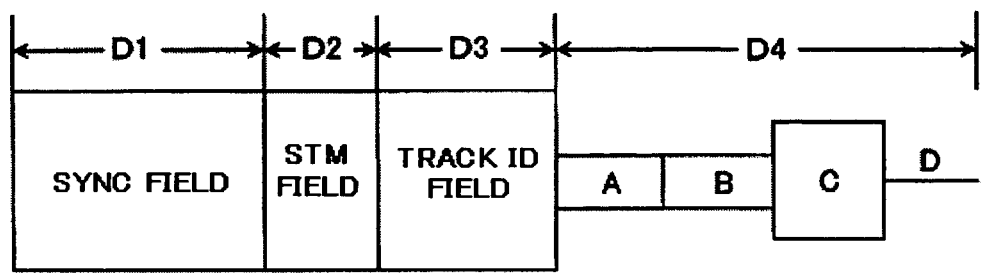
(a)
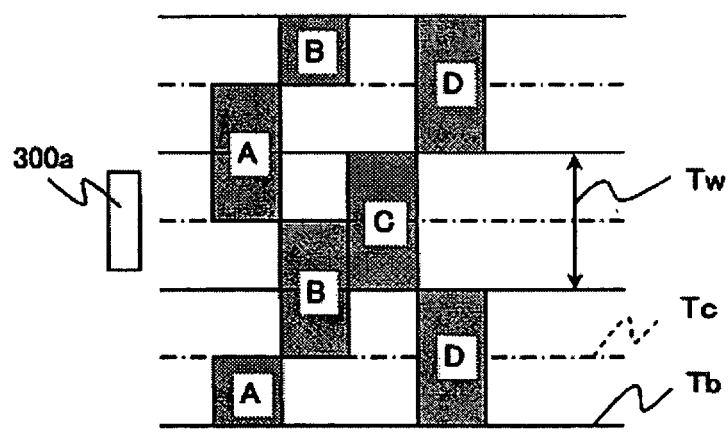
(b)

METHOD OF SELF SERVO WRITE WITH LOW DENSITY GAS

This application claims priority from Japanese Patent Application No. JP2004-219798, filed Jul. 28, 2004, the entire disclosure of which is incorporated herein by reference.

BACKGROUND OF THE INVENTION

The present invention relates to a disk device capable of writing servo data by itself (referred to as "self servo track write") and a manufacturing method therefor, and more particularly to a disk device having increased head positioning accuracy and a manufacturing method therefor.

Known data storage devices use various types of media such as optical disks and magnetic tape. Among these data storage devices are hard disk drives (HDDs), which have been widely used as storage for computers and are now essential storage devices in computer systems. Their applications, however, are not limited to computers. Due to their superior characteristics, HDDs have found application in an increasing number of fields. For example, they have been used in video recording/reproducing apparatuses and car navigation systems and also used as removable storage (memory) for digital cameras.

Magnetic disks used in a HDD have a plurality of concentric tracks formed thereon, each track including data areas for storing data and servo areas for storing servo data. Specifically, the data areas store user data while the servo areas store address information (servo data). Data write or data read can be performed by causing a magnetic head formed of a thin-film element to access a desired area (address) according to address information.

The servo data stored in each servo area includes a cylinder ID, a servo sector number, and a burst pattern. A track ID indicates the address of a track, and a servo sector ID indicates the address of a servo sector. The burst pattern holds relative positional information on the magnetic head with respect to the track. A burst pattern is made up of a plurality of bursts (signals), each stored in a plurality of regions. These regions are arranged at regular intervals in a disk radial direction such that the bursts have different phases.

Data is written to or read from a magnetic disk while checking the position of the magnetic head over the rotating magnetic disk based on servo data. The servo data read by the magnetic head is processed by the controller. The controller determines the value of the current to be supplied to the voice coil motor (VCM) based on the relationship between the current magnetic head position and the target magnetic head position. The controller then generates control data (DACOUT) indicating the calculated current value, and inputs it to the VCM driver. In the positional control of the magnetic head, the carriage is driven so as to eliminate the difference between the current and the target magnetic head positions.

Recently, in order to develop a higher capacity HDD, there has been a tendency to reduce the track pitch and thereby increase the track density. Producing a narrow track requires writing the above servo data with high precision to accurately control the position of the head. Therefore, the servo track write (STW) process for writing servo data has become an extremely important production process. To enhance the positioning accuracy, higher-precision optical encoders have been used, or external STW devices have been used to write servo data to a separate disk to reduce mechanical vibrations. However, wind disturbance due to the rotation of the disk and disk flutter have now become two major factors in determining the accuracy of the servo track write operation; they are very difficult to reduce.

To solve the above problem, the specification of U.S. Pat. Application (laid-open) No. 2003/0081344 discloses a servo track writer which performs servo track write operation in a low density gas atmosphere. Specifically, the technique disclosed in the above patent document inserts a disk to which servo data is to be written into the servo track writer, replaces the air within the servo track writer with a low density gas such as He, and then performs an STW operation. Performing STW operation in a low density gas atmosphere reduces the disk vibration in the STW process.

Further, a proposed conventional method for reducing disk flutter is to produce and ship a HDD product filled with a gas lighter than air. See, for example, Japanese Patent Publication No. 60-59660. The technique disclosed in that patent publication removes air from within a hermetically sealed magnetic disk storage device and fills it with helium or hydrogen instead, which makes it possible to reduce windage loss and thereby prevent an increase in the internal temperature of the device due to use of a high density magnetic disk.

BRIEF SUMMARY OF THE INVENTION

The technique disclosed in the above U.S. Pat. Application (laid-open) No. 2003/0081344 requires a special servo track writer having a hermetically sealed structure, in addition to a HDD. Furthermore, before the STW process, the atmosphere within the servo track writer must be replaced with a low density gas after a disk is set in the device, and then, the gas within the servo track writer must be replaced with air again after the STW process. The above series of operations must be performed each time servo data is written to a disk. This significantly complicates the HDD manufacturing process, resulting in increased production costs.

A HDD filled with a gas other than air as described in the above Japanese Patent Publication No. 60-59660 exhibits reduced disk flutter when the user uses the HDD. To provide users with a HDD filled with a gas other than air, however, it is necessary to fully seal the device, which requires accommodating humidity and temperature changes. Further, if the gas escapes from the device during its use, performance degradation results, which might lead to a serious defect. Furthermore, it may become necessary to collect used HDDs containing the gas from users. Thus, it is very difficult to provide users with a HDD filled with a gas other than air. Therefore, such an arrangement is extremely impractical and has yet to be realized.

The present invention has been devised to solve the above problems. It is, therefore, a feature of the present invention to provide a method for manufacturing a disk device capable of writing highly accurate servo data using an extremely simple technique, as well as providing a disk device storing highly accurate servo data written thereto.

In accordance with one aspect, the present invention provides a method for manufacturing a disk device including a disk, a head for writing/reading data to/from the disk, a drive unit for driving the disk and the head, and an enclosure containing the disk, the head, and the drive unit, the method comprising: mounting the disk, the head, and the drive unit in the enclosure; replacing air within the enclosure with a gas having a lower density than the air; writing servo data to the disk in a self servo track write operation; and replacing the gas within the enclosure with air.

Thus, the present invention writes servo data in a self servo track write operation after replacing the air within the enclosure with a gas having a lower density than air. This arrangement can reduce the runout due to air resistance, allowing the servo data to be accurately written.

Further, the above gas is preferably an inert gas or a mixed gas consisting of an inert gas and air. Use of inert gas is safe since it does not react with other materials.

Further, the above gas is preferably helium, hydrogen, a mixed gas consisting of helium and air, or a mixed gas consisting of hydrogen and air. Helium is easy to handle and has a density approximately one-tenth of the density of air and hence exhibits gas resistance only approximately one-tenth of air resistance. Hydrogen has a lower gas density than helium and hence produces large flutter reduction effect.

Further, when replacing the air within the enclosure with the gas, the air may be discharged while introducing the gas into the enclosure. This arrangement can maintain the pressure within the enclosure at a constant value.

Further, when replacing the air within the enclosure with the gas, the air may be discharged while introducing the gas through an existing test hole for a particle count test provided on the enclosure. Use of the existing test hole for a particle count test as a vent eliminates the need for newly providing a vent on the enclosure.

Further, when replacing the air within the enclosure with the gas, a tube smaller in diameter than the test hole may be inserted into the test hole, and the gas may be introduced through the tube. At that time, in order to replace the air within the enclosure with the gas, the gas may be introduced into the enclosure such that the air is driven out of the enclosure through the gap between the tube and the test hole.

Further, when replacing the air within the enclosure with the gas, the air may be discharged while introducing the gas through a vent provided on the enclosure.

Further, when replacing the air within the enclosure with the gas, the air may be discharged through a second vent provided on the enclosure while introducing the gas through a first vent provided on the enclosure. Providing vents for introducing the gas and for discharging the air can increase the efficiency of the replacement operation.

Further, when replacing the gas within the enclosure with air, the gas may be discharged through the first vent while introducing air through the second vent. Further, the first vent may be provided on the top side of the enclosure and the second vent may be provided on the bottom side of the enclosure. With this arrangement, the gas having a lower density than air can be introduced or discharged on the top side of the enclosure, thereby increasing the efficiency of the replacement operation.

Further, the first vent and the second vent may be diagonally disposed on the enclosure, and the air within the enclosure may be discharged through the second vent while introducing the gas through the first vent. This arrangement can further increase the speed of replacement of the air with the gas.

Further, when replacing the gas within the enclosure with air, the vent(s) may be left open to the atmosphere, making it possible to omit the air introducing step.

According to another aspect of the present invention, there is provided a disk device comprising: a disk; a head for writing/reading data to/from the disk; a drive unit for driving the disk and the head; and an enclosure containing the disk, the head, and the drive unit; wherein the enclosure is provided with a vent for introducing a gas into the enclosure so as to discharge air from the enclosure before performing a self servo track write operation, the gas having a lower density than air.

According to still another aspect of the present invention, there is provided a disk device comprising: a disk storing servo data written by the disk device itself; a head for writing/reading data to/from the disk; and a controller for controlling a position of the head based on a position error signal generated from a read signal obtained as a result of reading the servo data; wherein a repeatable runout component of the position error signal obtained from the servo data is smaller than a non-repeatable runout component of the position error signal.

It should be noted that position error signals generally include a component which was written into servo data as an NRRO component (vibration) in a self servo track write (SSTW) operation. This component appears as an RRO (repeatable runout) component when the servo data is read out, since the track following operation is performed along the written NRRO (non-repeatable runout) component. This RRO component in each position error signal is hereinafter referred to as "frozen NRRO". If frozen NRRO is large, the track pitch balance degrades since the phase of frozen NRRO is different in neighboring tracks. The servo data written by the above disk device of the present invention includes reduced frozen NRRO, allowing the degradation of the track pitch balance to be reduced.

The present invention provides a method for manufacturing a disk device capable of writing highly accurate servo data using an extremely simple technique, as well as providing a disk device including a disk which stores servo data whose runout component is small.

BRIEF DESCRIPTION OF THE DRAWINGS

FIG. 4(a) is a schematic diagram showing exemplary servo data; and FIG. 4(b) is a diagram illustrating seamed-type bursts A, B, C, and D.

DETAILED DESCRIPTION OF THE INVENTION

An exemplary embodiment of the present invention will be described below in detail with reference to the accompanying drawings. The present embodiment provides a method for manufacturing a hard disk drive. This method replaces the atmosphere within the head disk assembly (HDA) with a gas having a lower specific gravity than air before performing a self servo write operation so as to make the runout components of the servo data fairly small, thereby dramatically increasing the head positioning accuracy.

Figure 1:
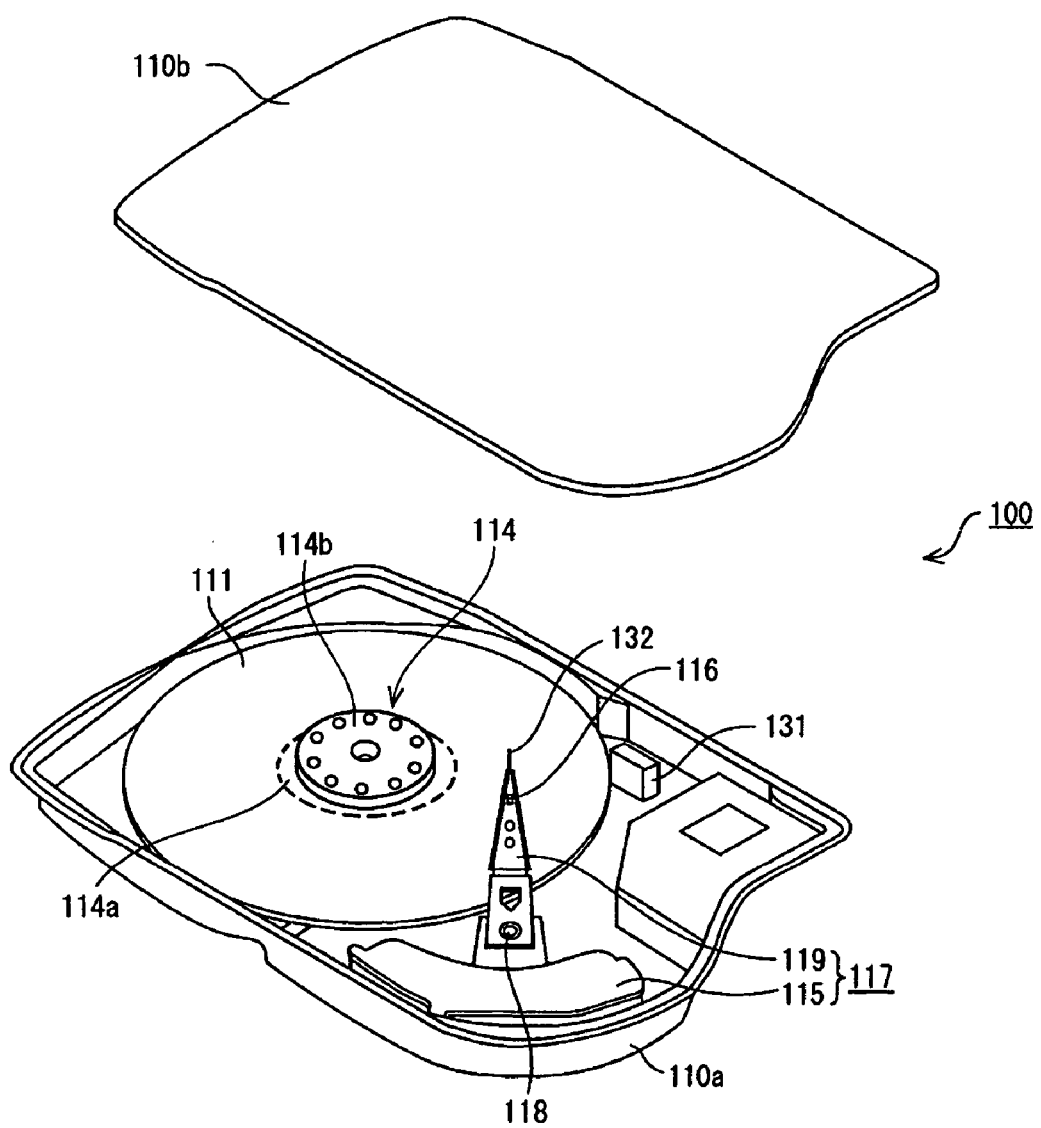
FIG. 1 is a perspective view schematically illustrating the configuration of a hard disk drive (HDD) according to an embodiment of the present invention.
Figure 2:
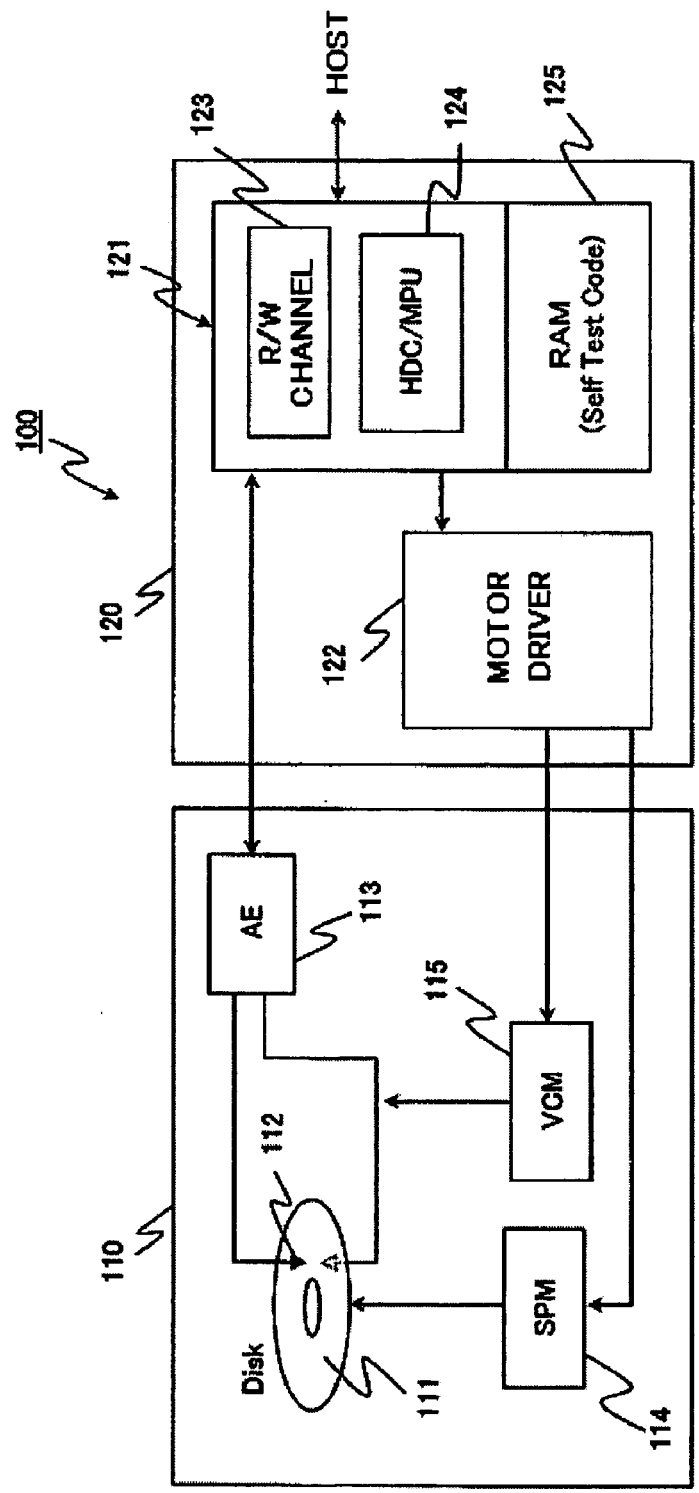
FIG. 2 is a block diagram showing the functions of the HDD according to the embodiment of the present invention.

FIG. 1 is a perspective view schematically illustrating the configuration of a hard disk drive (HDD) 100 according to the present embodiment, and FIG. 2 is a block diagram showing its functions.

As shown in FIG. 1, the HDD 100 comprises: a boxy base 110a having an opening; and a top cover 110b made up of a plate for covering the opening of the base 110a. The base 110a and the top cover 110b are fixed to each other by a gasket of fluorine rubber (not shown), collectively constituting a disk enclosure. This disk enclosure contains components of the HDD 100 and can be sealed nearly hermetically even through it has a vent for adjusting the internal pressure.

The base 110a has each (HDD) component mounted therein. The base 110a is formed by pressing a magnetic material such as a steel (SPCC) plate. Or alternatively, the base 110a may be formed of aluminum.

A magnetic disk 111 is an involatile storage disk which stores data when its magnetic layer is magnetized. The magnetic disk 111 is formed of an aluminum substrate or a glass substrate. The magnetic disk 111 is fixed to a spindle motor (SPM) 114 by a top clamp 114b. The SPM 114 is fixed to the base 110a and rotates the magnetic disk 111 at a predetermined rotational speed.

A head 116 writes/reads data to/from the magnetic disk 111. The data is exchanged between the HDD 110 and the host (not shown). The head 116 includes: a write element for converting an electric signal into a magnetic field according to write data to the magnetic disk 111; and a read element for converting a magnetic field generated from the magnetic disk 111 into an electric signal. The head 116 is disposed on a slider.

An actuator 117 supports the head 116. The actuator 117 is pivotally mounted on an actuator shaft 118 and includes an actuator arm 119 and a VCM (voice coil motor) 115. The VCM 115 pivotally moves the actuator arm 119 about the actuator shaft 118 according to the drive current flowing in the flat coil such that the head 116 moves to a position above the magnetic disk 111 or leaves the magnetic disk 111.

The HDD 100 is of the load/unload type. When the magnetic disk 111 stops rotating, the actuator 117 unloads the head 116 from the data area onto a ramp 131. When the head 116 is parked on the ramp 131, the tab 132 formed on the tip of the actuator arm 119 slides on the ramp 131, allowing the head 116 to stop at a predetermined position. It should be noted that in the case of CSS (contact start and stop) HDDs, the head 116 is unloaded onto the CSS zone formed on the inner circumferential side of the magnetic disk 111.

It should be further noted that even though the HDD 100 shown in FIG. 1 includes only a single magnetic disk 111, it may have two or more magnetic disks. When a plurality of magnetic disks each storing data on both surfaces are employed, these magnetic disks are integrally held onto a hub 114a at predetermined intervals in the direction of the rotating shaft of the SPM 114. Further, as many actuator arms (including the actuator arm 119) as there are storage surfaces are incorporated. They each have a head for scanning a respective storage surface and are fixed to the actuator 117 at predetermined intervals such that they overlap one another.

As described above, the disk enclosure 110 in the HDD 100 is made up of the base 110a and the top cover 110b and contains the magnetic disk 111, the head device unit 112

(corresponding to the head 116), arm electronics (AE) 113, the SPM 114, and the voice coil motor (VCM) 115, as shown in FIG. 2. The HDD 100 also comprises a circuit board 120 fixed to the outside of the enclosure 110. On the circuit board 120 are formed a motor driver unit 122 and a signal processing circuit 121 for processing signals exchanged with the AE 113 and the host. The signal processing circuit 121 includes a read/write channel (R/W channel) 123, a hard disk controller/MPU integrated circuit (hereinafter referred to as "HDC/MPU") 124, and a RAM 125, all contained in a single package.

In a write operation, the HDC/MPU 124 receives write data from the external host, and the head device unit 112 writes the write data to the magnetic disk 111 after receiving it through the R/W channel 123 and the AE 113. In a read operation, on the other hand, the head device unit 112 reads out data stored on the magnetic disk 111, and the HDC/MPU 124 outputs the read data to the external host after receiving it through the AE 113 and the R/W channel 123.

A description will be given below of each component of the HDD. The magnetic disk 111 is fixed to the rotating shaft of the SPM 114. The SPM 114 is driven by the motor driver 122 such that it rotates the magnetic disk 111 at a predetermined speed. The magnetic disk 111 has two recording surfaces for storing data, and a head device unit 112 is provided for each recording surface. Each head device unit 112 is fixed to a slider (not shown) which in turn is fixed to the actuator arm 119 shown in FIG. 1. The actuator arm 119 is fixed to the VCM 115, which pivotally moves the actuator arm 119 and, hence, the sliders and the head device units 112 thereon.

The actuator arm 119 moves each head device unit 112 to a position over the data area on a surface of the rotating magnetic disk 111 to read or write data. Specifically, pivotally moving (or swinging) the actuator arm 119 moves each head device unit 112 over a surface of the magnetic disk 111 in a radial direction, enabling each head device unit 112 to access a desired area.

Each head device unit 112 is typically made up of a write head and a read head integrally formed with each other. (The write head converts an electrical signal into a magnetic field according to the data to be written to the magnetic disk 111, while the read head converts a magnetic field generated from the magnetic disk 111 into an electrical signal.) Specifically, an MR read/thin film write composite head (MR head) is used to meet the recent demand for high recording density. This composite head includes a thin film write head and a read head. Examples of read heads for this composite head include: MR heads, which utilize magneto resistive (MR) effect; GMR heads, which utilize giant magneto resistive (GMR) effect; and DSMR (dual stripe magneto resistive) heads, which are made up of two MR elements and are highly effective in reducing thermal asperity (TA) due to contact with the medium.

The pressure (to each head device unit) generated due to the viscosity of the air between the rotating magnetic disk 111 and the ABS (air bearing surface) surface of the slider facing the magnetic disk 111 balances with the pressure applied (to the head device unit) by the actuator arm 119 toward the magnetic disk 111, causing the head device unit 112 to float above the magnetic disk 111 with a certain gap therebetween.

The AE 113 selects one of the plurality of head device units 112 for data access, pre-amplifies the read signal generated by the selected head device unit 112 with a certain gain, and outputs it to the R/W channel 123. Furthermore, the AE 113 receives a write signal from the R/W channel 123 and outputs it to a selected head device unit 112.

The R/W channel 123 performs write processing on data obtained from the host. Specifically, in the write processing, the R/W channel 123 code-modulates the write data supplied from the HDC/MPU 124 and then converts the code-modulated write data into a write signal (an electric current) before supplying it to the AE 113. The R/W channel 123 performs read processing when supplying data to the host.

In the read processing, the R/W channel 123 amplifies the read signal supplied from the AE 113 to a given amplitude, extracts data from the amplified read signal, and performs decode processing on the data. The read data includes user data and servo data. The decoded read data is supplied to the HDC/MPU 124. It should be noted that after servo data is written to the magnetic disk 111, the read signal from the R/W channel 123 is used to determine whether the track width is normal or abnormal (whether the track pitch balance is appropriate).

The HDC/MPU 124 is a circuit made up of an MPU and an HDC which are integrated on a single chip. The MPU operates according to microcode loaded into the RAM 125 and performs control operations on the entire HDD 100, such as generation of a position error signal based on burst data to control the position of the head device unit 112, interface control, and defect management, as well as performing the processing necessary for data processing. At startup of the HDD 100, the microcode to be executed on the MPU and the data necessary for the control and data processing are loaded into the RAM 125 from the magnetic disk 111 or ROM (not shown).

According to the present embodiment, the HDD 100 performs a self servo track write (SSTW) operation to write servo data by itself, and then checks whether the servo data has been written with predetermined accuracy. Specifically, this verifying step checks whether the track width established by each burst pattern (or servo burst) included in the servo data written to the magnetic disk 111 is normal (that is, not partially narrowed or widened) to detect tracks with an inappropriate width (defective tracks) and registers them with a defect table stored in a predetermined area on the magnetic disk 111. When writing data, the HDD 100 checks the defect table and performs control such that no data is written to these registered defective tracks.

It should be noted that the HDD 100 may perform the above verification processing by itself to detect defective tracks, as follows. A flag for starting the verification processing is set on the magnetic disk 111 beforehand; and when power is turned on, a verification processing program (or self test code) is read from the magnetic disk 111 and loaded into the RAM 125 through the AE 113, the R/W channel 123, and the HDC/MPU 124 and executed.

The HDC/MPU 124 is provided with an interface capability to the host and receives user data and commands such as read/write commands sent from the host. The received user data is transferred to the R/W channel 123. The HDC/MPU 124 also receives the data read out from the magnetic disk 111 through the R/W channel 123 and transfers it to the host. Furthermore, the HDC/MPU 124 performs error correction (ECC) processing on the user data obtained from the host or read out from the magnetic disk 111.

The data read out by the R/W channel 123 includes servo data as well as user data. The HDC/MPU 124 controls the position of each head device unit 112 based on the servo data. The HDC/MPU 124 outputs control data to the motor driver unit 122. The motor driver unit 122 supplies a drive current to the VCM 115 according to a control signal.

Furthermore, the HDC/MPU 124 controls data read/write processing based on the servo data.

Figure 3:
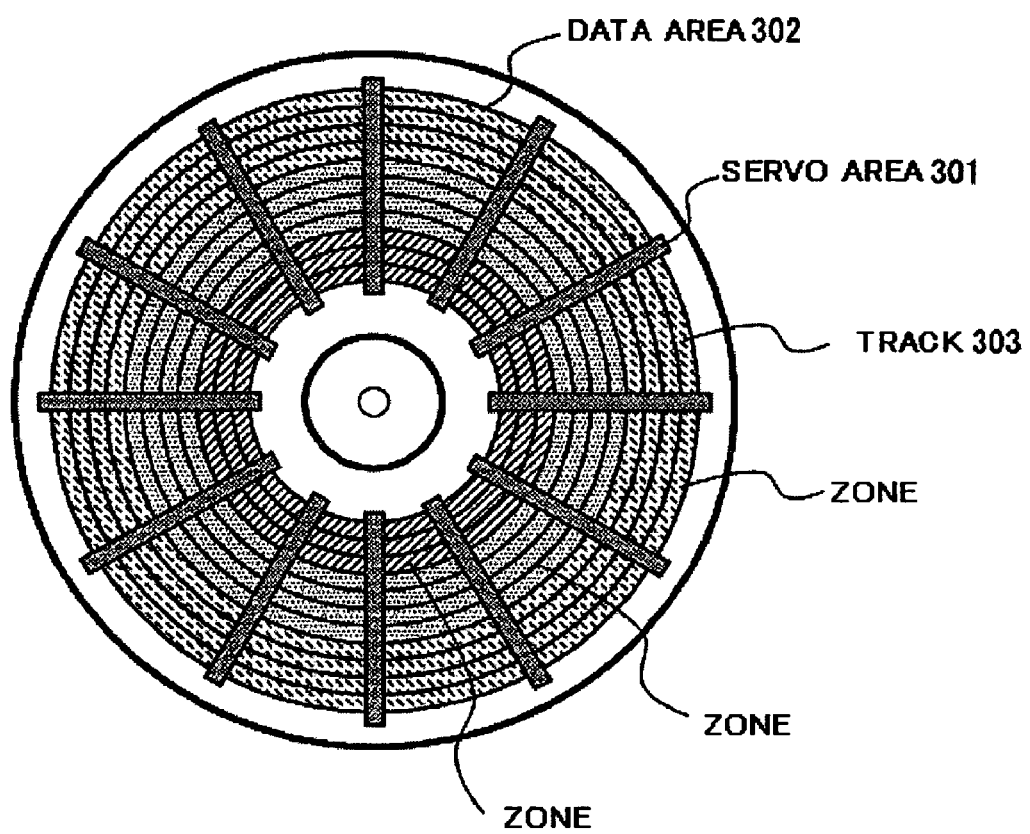
FIG. 3 is a schematic diagram showing the arrangement of the data stored on a recording surface of a magnetic disk of the HDD according to the embodiment of the present invention.

A description will be given of the data stored on the magnetic disk 111 with reference to FIG. 3. FIG. 3 schematically shows the arrangement of the data stored on a recording surface of the magnetic disk 111. As shown in FIG. 3, on the recording surface of the magnetic disk 111 are formed a plurality of servo areas 301, each extending from the center of the magnetic disk 111 in a radial direction at a predetermined angle, and a plurality of data areas 302, each disposed between two neighboring servo areas 301. Thus, the servo areas 301 and the data areas 302 are alternately disposed at a predetermined angle relative to one another. Each servo area 301 stores data for controlling the position of the head device unit 112, while each data area 302 stores user data.

Also on the recording surface of the magnetic disk 111 are formed a plurality of concentric tracks 303 with a predetermined width in a radial direction. The servo data and the user data are stored along the tracks 303. Each track segment (303) between servo areas 301 includes a plurality of data sectors (in which user data is stored as a unit). The tracks 303 are grouped into a plurality of zones according to their radial position on the magnetic disk 111. The number of sectors in each track 303 varies depending on the zone to which it belongs. The example in FIG. 3 employs three zones. A different recording frequency may be set for each zone so as to increase the recording density.

A description will be given below of the servo data stored in each servo area on the magnetic disk 111. The magnetic disk 111, which is a recording medium to which data is written by a write magnetic head, stores servo data to follow the concentric tracks. The servo data is written at a plurality of locations on the tracks. As shown in FIG. 4($a$), each piece of servo data includes known data fields such as: a sync field D1 for storing sync data for data synchronization; an STM (servo track mark) field D2 for storing a servo mark indicating the beginning of the servo data; a track ID field D3 for storing positional information indicating the number of the track, etc.; and a burst field D4 for storing a burst pattern for fine positioning control. The sync field D1 also stores servo AGC (automatic gain control) used to adjust the gain of the signal amplifier such that the amplitude (of the signal from the signal amplifier) is constant before reading out the servo data.

The burst pattern stored in the burst field D4 is made up of, for example, 4 types of burst patterns, namely bursts A, B, C, and D, as shown in FIG. 4($b$). The burst pattern is read by the head. Changes in the amplitude of the read signal (or burst signal) are converted into numbers, which are used for tracking control (track following), etc. by the head device unit 112.

It should be noted that in FIG. 4($b$), Tc denotes a track center, Tb denotes a track border, and Tw denotes a track width. In the burst pattern shown in FIG. 4($b$), the bursts A, B, C, and D are signals written in different areas at regular intervals. The bursts A and B are written in areas defined between each two neighboring track centers Tc, each area including a track border Tb. The bursts A and B appear alternately with a certain period. The bursts C and D, on the other hand, are written in individual tracks. They also appear alternately with a certain period; if the burst C appears in odd tracks, then the burst D appears in even tracks, and vice versa. The bursts A to D are written in the direction in which the tracks extend, and repeat approximately 10 times. The position at which the amplitudes of the read signals of the bursts A and B balance each other is recognized as a track center Tc. The read head 300$a$ is controlled such that it is positioned at this position. Head misalignment may be indicated by an error signal generated based on, for example, the sum or the difference of integrated absolute values of the amplitudes or waveforms of the read signals of the bursts A and B.

There are two methods for writing an entire burst pattern. The first is to write it in two write operations. That is, this method first writes a first burst pattern segment and then writes a second burst pattern segment over the first burst pattern segment while trimming the first burst pattern segment, producing the entire burst pattern. The second method for writing an entire burst pattern is to write it in a single write operation (without overwriting and trimming). The burst pattern written by the first method has a seam since it is written in two write operations (writing the second burst pattern segment over the first burst pattern segment). Therefore, in this specification, the first method is referred to as "the seamed method", and a servo pattern written by the seamed method is called "a seamed servo pattern". On the other hand, the burst pattern written by the second method has no seams since it is written in a single write operation (without overwriting and trimming). Therefore, in this specification, the second method is referred to as "the seamless method", and a servo pattern written by the seamless method is called "a seamless servo pattern". The seamless servo pattern has a constant width since it is written using the same write head. Generally, the width of the track is larger than the width of the write head. This means that a gap is formed between each two neighboring seamless servo patterns in a radial direction.

According to the present embodiment, no servo writer is used to write servo data to the magnetic disk 111. Instead, the HDD 100 writes the servo data by itself, which is referred to as "the self servo write system". The servo writer accuracy and the time required to write servo data increase proportionally with increasing number of tracks per a storage surface of a magnetic disk (track density). This means that a servo track write (STW) operation requires an expensive servo writer with a desired write accuracy to be installed in a clean room for a number of manufacturing cycles. The self servo track write (SSTW or SSW) system, however, eliminates this requirement and thereby facilitates the manufacture of HDDs, resulting in enhanced productivity.

Ideally, an SSTW operation must write servo data such that the resultant track has a constant width or a width varying only within a certain range, whether by the seamless method or the seamed method. In reality, however, the track width may be partially narrowed or widened due to disturbance, vibration, etc. If this occurs, the track width established by a seamed servo pattern changes since the width of the servo pattern in a radial direction of the magnetic disk varies. The width of the seamless servo pattern, on the other hand, does not change since it is written in a single write operation using the same write head. However, the gap between each two neighboring seamless servo patterns in a radial direction of the magnetic disk changes. The above servo data verifying step may actually write data and then check whether the written data can be properly read out. Or, to determine whether the track width is normal or abnormal, the above step may measure the widths of seamed servo patterns or measure the gaps between seamless servo patterns.

A description will be given below of a method for manufacturing the HDD 100 according to the present embodiment. The method for manufacturing the HDD 100 according to the present embodiment assembles the HDD 100 in an ordinary assembly process and then writes servo data in a self servo track write (SSTW) operation and performs a predetermined inspection process. The present embodiment is characterized in that the above SSTW operation is carried out in an atmosphere of a gas having a lower density than air (low density gas), instead of in an air atmosphere as is done conventionally, dramatically increasing the servo data write accuracy.

The head positioning control process first reads the servo data with the head, then generates, based on the read signal, a position error signal (PES) indicating how far the head is from the center line of the nearest track, and controls the actuator based on this position error signal.

As track density increases due to increased recording density, it becomes difficult to keep a head positioned over the center line of a desired track with high accuracy. A known factor in reducing the head positioning accuracy is the so-called disk runout, which indicates the relative displacement between the head and the disk medium. There are two types of disk runout: the repeatable runout (RRO), which repeatedly occurs in synchronization with the rotation of the spindle motor for rotating the disk (this runout is referred to as "the primary runout"); and the non-repeatable runout (NRRO), which is not synchronous with the rotation. Both of them cause the head to deviate from the center line of the track during the track following operation, thereby increasing the magnitude of the position error signal (PES).

Recently, such runout errors have further increased due to increased disk rotational speed, since an increase in the rotational speed leads to an increase in the air resistance to the rotating members including the disk (windage loss). When user data is written to or read from a disk, special processing is carried out to reduce the influence of the air resistance on the position error signal (PES) due to the rotation of the disk in order to follow the track, for example. To do this, however, the HDC/MPU 124, etc. must generate a correction signal based on the servo data and control the VCM 115, etc. using this signal, resulting in complicated processing.

After intensively studying the above problems and conducting experiments, the present inventors have found that the SSTW operation may be performed after replacing the atmosphere within the HDA with a gas having a lower density than air to remove detrimental runout components very effectively, considering the fact that the head positioning accuracy can be increased by increasing the servo data write accuracy at the manufacturing stage.

Specifically, according to the present embodiment, after assembling the HDD 100, the air within the HDA of the HDD 100 is replaced by a gas (low density gas) lighter than air, such as He, before writing servo data in a self servo track write (SSTW) operation. After writing the servo data in the SSTW operation in an atmosphere of the low density gas, the atmosphere (low density gas) within the HDA is replaced with air again. This arrangement can reduce the runout components (at around 1 to 2 kHz) of the position error signal generated based on the servo data.

The low density gas having a lower density (specific gravity) than air, which replaces the atmosphere within the HDA before the SSTW operation is performed, is preferably an inert gas such as He or Ne, or an extremely low density gas such as $H_2$, or a mixed gas consisting of these gases or these gases and air. Particularly, He is easy to handle and has a density approximately one-tenth of that of air. Use of He makes it easy to write servo data with high precision since replacing the atmosphere within the HDA with helium can reduce the influence of the windage loss by a factor of 10.

Hydrogen is an extremely light gas. Use of hydrogen makes it possible to considerably reduce the gas resistance and thereby produce larger flutter reduction effect. Therefore, the low density gas is preferably helium or hydrogen, or a mixed gas consisting of two or three components including helium or hydrogen.

Figure 5:
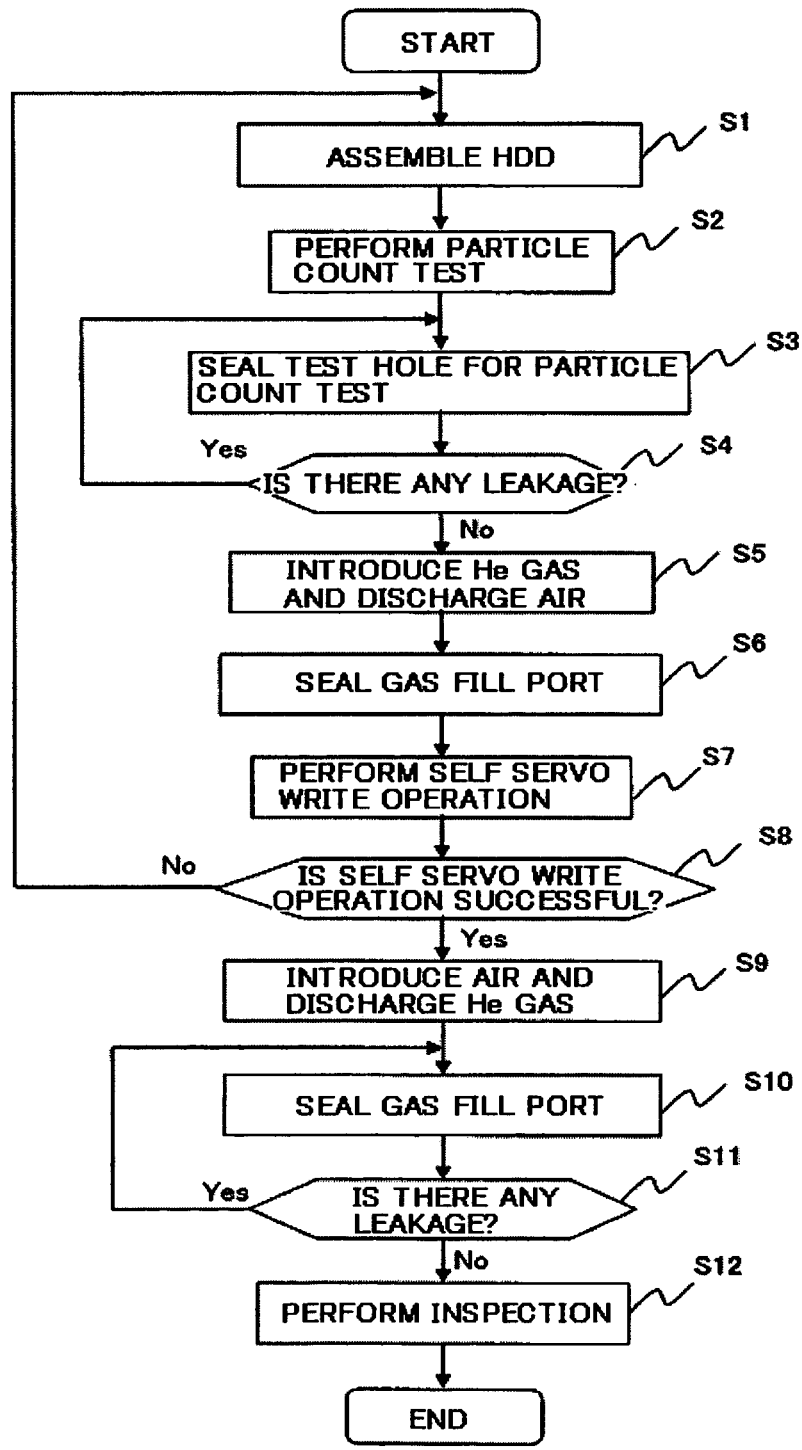
FIG. 5 is a flowchart illustrating a method for manufacturing the HDD according to the embodiment of the present invention.

FIG. 5 is a flowchart illustrating the method for manufacturing the HDD 100 according to the present embodiment. First of all, step S1 prepares the base 110*a* and the top cover 110*b* collectively constituting the disk enclosure 110, mounts the magnetic disk 111 and each assembly for driving the magnetic disk 111, such as the SPM 114 and the VCM 115, in the base 110*a*, and attaches the top cover 110*b* so as to seal the disk enclosure 110 with each assembly of the HDD 100 therein, as shown in FIG. 5.

Then, since the inside of the HDA must be kept highly clean, step S2 carries out a particle count test to measure the internal cleanliness and determines whether the cleanliness is higher than a specified value. For example, the base 110*a* of the HDD 100 has a test hole approximately a few millimeters in diameter for the particle count test. After performing the test, if the cleanliness is higher than the specified value, the above test hole is sealed with seal tape at step S3. Then, step S4 checks whether there is any leakage from the HDA. If yes, the test hole is sealed again. It should be noted that if the particle count test at step 2 indicates that the cleanliness is not higher than the specified value, or if there is leakage even after the test hole is sealed one or a plurality of times at step S3, then the process returns to step S1 at which the HDD 100 is assembled again after replacing the base, etc., for example.

Then, a self servo track write (SSTW) operation is performed. First, before performing the SSTW operation, the air within the HDA is replaced with He at step S5. Specifically, this step introduces He into the HDA while discharging the air from the HDA, thus maintaining the pressure within the HDA at a substantially constant value. This is because the disk enclosures of recent HDDs are made up of thin metal plates to reduce their weight and therefore reduced pressure might deform these metal plates. When the air within the HDA is replaced with He before performing a servo write operation, or when the He within the HDA is replaced with air after performing the servo write operation (described later), if the flow rate of the replacement gas is too high, the internal pressure becomes high. If, on the other hand, the flow rate of the replacement gas is too low, it takes a long time to complete the replacement. Therefore, considering the above, the flow rate is set to an appropriate value. Further, the time it takes to completely replace the atmosphere within the HDA with He may be experimentally obtained beforehand, and whether the atmosphere within the HDA has been replaced with He may be determined based on the obtained result. It should be noted that if the HDA has a structure which can withstand reduced pressure, it may be evacuated to a vacuum before introducing He, or it may be purged with nitrogen, etc. and then the nitrogen may be replaced with He, for example.

A double-walled tube may be used to introduce He into the HDA. Specifically, the disk enclosure 110 may be provided with a vent hole, and the double-walled tube may be connected to the vent hole. With this arrangement, He may be introduced through the inner tube, while the air may be discharged through the outer tube.

Figure 6:
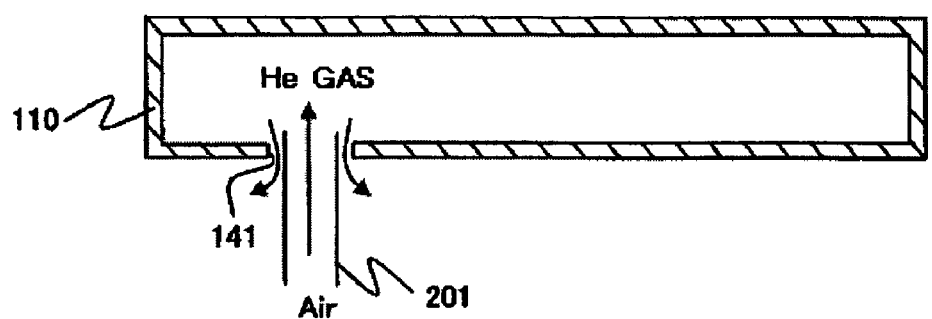
FIG. 6 is a diagram showing an example of how to replace the air within the HDA with He.

The following is another method for introducing He into the disk enclosure. FIG. 6 is a diagram showing an example of how to replace the air within the HDA with He. In the figure, a tube 201 for introducing He is connected to a test hole 141 for a particle count test provided on the disk enclosure 110 made up of a base and a top cover. As in FIG. 6, the tube 201 is set smaller in diameter than the test hole 141 for the particle count test, forming a gap between the tube 201 and the test hole 141. With this arrangement, He may be introduced through the tube 201 while discharging the air through the gap.

Figure 7:
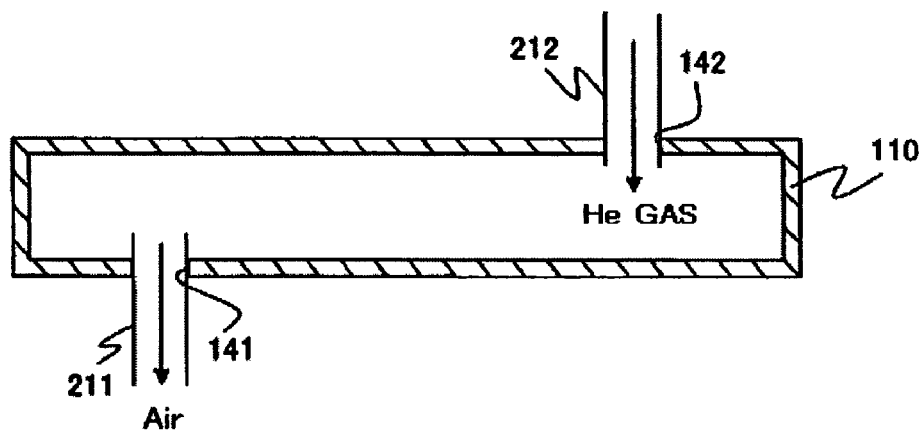
FIG. 7 is a schematic diagram showing an example in which the base is provided with a vent separately from a test hole.

In the example shown in FIG. 6, the test hole 141 is used as both a He fill port and an air vent. However, a He fill port and an air vent may be provided separately from the test hole 141, or the test hole 141 may be used as a gas fill port and a gas vent may be provided. FIG. 7 is a schematic diagram showing an example in which a vent 142 is provided separately from the test hole 141. As shown in FIG. 7, the vent 142 provided on the top cover side is used as the He fill port, and the test hole 141 is used as the air vent. Providing a He fill port on the top of the disk enclosure 110 (that is, on the top cover side) makes it easy to introduce or discharge He, which has a lower density than air. Further, for the same reason, when He is discharged and air is introduced, the test hole on the base side may be used as the air fill port and the vent 142 on the top cover side may be used as the vent for discharging He.

When a He vent and an air vent are separately provided, it is preferable that they are positioned diagonally on the disk enclosure. For example, one of them may be provided on the top cover side near one end of the disk enclosure, while the other vent may be provided on the base side near the other end. Diagonally arranging these vents with a certain distance therebetween ensures replacement of gas.

Referring back to FIG. 5, after filling the HDA with He, the He fill port is sealed at step S6. After making sure that there is no leakage (as in the leakage test on the test hole 141 at step S4), step S7 performs a self servo write operation in an ordinary manner. Specifically, the HDD 100 writes servo data by itself while shifting the head by one-half of the track pitch at a time. The written servo data may be a seamed servo pattern or a seamless servo pattern. It should be noted that if the self servo write operation has failed due to the head being unable to write, etc. (the "yes" branch from step S8), then the process returns to the assembly step S1.

Upon completion of the servo data write operation, step S9 discharges He while introducing air through the above He fill port, replacing the atmosphere within the HDA with air. When the fill tube 201 shown in FIG. 6 is used, step S9 introduces air through the tube instead of He so as to discharge He from the HDA. Further, when two vents are provided on the disk enclosure as shown in FIG. 7, air may be introduced through the tube 211, and He may be discharged through the tube 212. In this case, the He discharged from the HDA may be collected by a collector for recycling. It should be noted that the vent(s) may be left uncovered so as to replace the atmosphere within the HDA with air.

Next, the test hole 141, which was used as a He fill port, is sealed with seal tape at step S10. After that, step S11 checks whether there is any leakage. If no, the process proceeds to the inspection step S12. This inspection step is carried out after completely removing the He, that is, the conditions inside the HDA are the same as before the HDA was filled with He. That is, the step is carried out in a conventional manner (not using the method of the present embodiment). For example, the inspection step checks whether the servo data has been properly written (whether the track pitch balance is good), and registers tracks (if any) whose track pitch balance is bad with a defect table on a cylinder basis or track basis as defective cylinders or tracks. (The defective table is stored in a predetermined area on the magnetic disk 111.). If the HDD 100 meets predetermined standards, it is shipped as a product. When writing user data, the HDD 100 checks this defect table and writes data to areas other than defective cylinders.

The present embodiment writes servo data in an SSTW operation, thereby eliminating the need for an external positioning device and an external clock. That is, an STW operation can be performed with the HDA hermetically sealed, allowing the operation to be carried out after replacing the atmosphere within the HDA with He. Such an arrangement can reduce the influence of wind disturbance and thereby dramatically reduce the runout components (occurring at around 1 to 2 kHz) of the position error signal, resulting in dramatically increased head positioning accuracy.

Further, the HDA is filled with He only for a few hours or so in the STW process. That is, the HDA must be maintained in a hermetically sealed state only for that period of time, and therefore no special arrangement is needed, simplifying the STW operation.

Further, the He is completely discharged from the HDA after the STW process, eliminating the risk of gas leakage from the HDA when the HDD is used by a user. Therefore, there is no possibility of degradation of product performance, etc. due to gas leakage.

The effects of the present invention will be described below. First of all, a description will be given of the runout components which can be reduced or removed by the present invention. As described above, there are two types of disk runout: repeatable runout (RRO), which repeatedly occurs (in synchronization with the rotation of the spindle motor); and non-repeatable runout (NRRO), which is not synchronous with the rotation. It should be noted that RRO components include mechanical vibrations synchronous and asynchronous with the rotation of the spindle motor. Both the synchronous and asynchronous mechanical vibrations are observed as RRO components synchronous with the rotation when the product performs a track following operation after they were written as servo data in an STW process. In this specification, the latter RRO component (asynchronous mechanical vibration) is referred to as "frozen NRRO" to distinguish it from the former ordinary RRO component.

Figure 8:
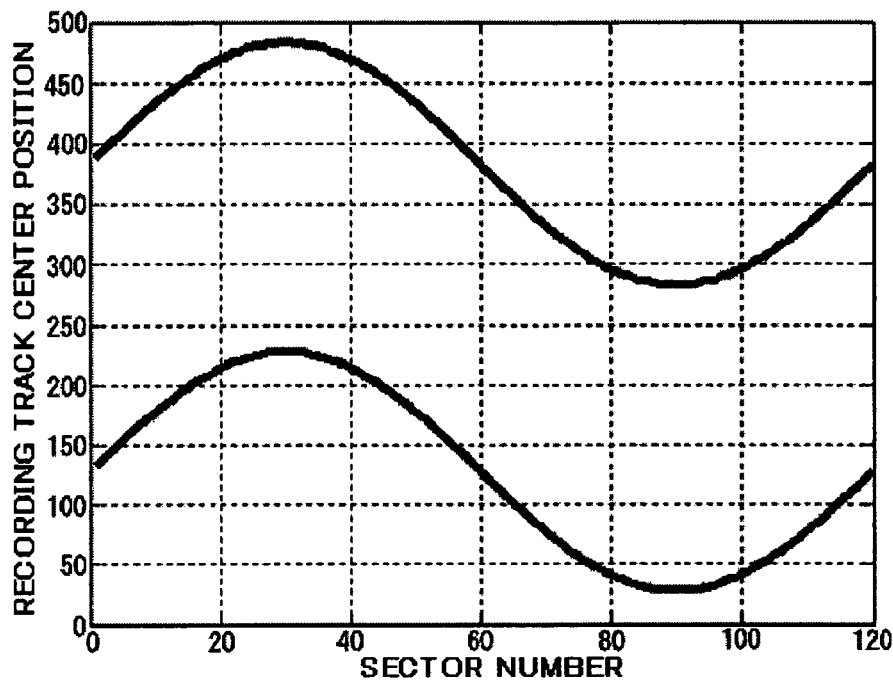
FIG. 8 is a graph illustrating RRO synchronous with the rotation of the spindle motor.
Figure 9:
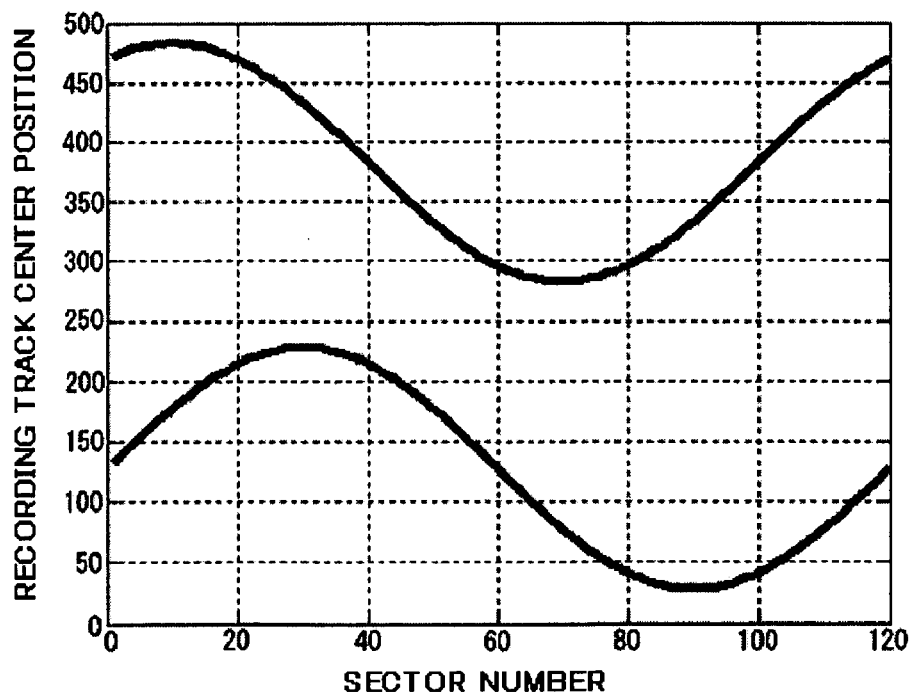
FIG. 9 is a graph illustrating frozen NRRO.

FIG. 8 is a schematic diagram showing RRO synchronous with the rotation of the spindle motor, and FIG. 9 is a schematic diagram showing frozen NRRO. In FIGS. 8 and 9, the horizontal axis represents the sector number, while the vertical axis represents the recording track center position. (Each figure shows the center positions of two neighboring recording tracks indicated by position error signals (PES).) Frozen NRRO, also referred to as "written NRRO", appears when a vibration (NRRO) asynchronous with the rotation is read out after it is written (as servo data) in an SSTW operation. Each RRO component synchronous with the rotation of the spindle motor has the same phase and therefore the track pitch between each two neighboring tracks does not change, as shown in FIG. 8.

Frozen NRRO components, on the other hand, are asynchronous with one another (having different phases in different tracks) and therefore the track pitch changes, which locally degrades the track pitch balance. Therefore, reducing frozen NRRO is very important in increasing the head positioning accuracy.

As described above, frozen NRRO appears when a component (vibration) asynchronous with the rotation, generally referred to as NRRO, is read out after it is written as servo data in an SSTW operation. Therefore, it is necessary to remove NRRO occurring in the SSTW operation. A factor in generating NRRO is that the air flow induced by the rotation of the hard disk at high speed hits the head slider and the arm. The present embodiment, however, performs an SSTW operation in an atmosphere of a gas having a lower density than air, such as He, instead of in an air atmosphere, to reduce the influence of the gas flow induced by the rotation of the hard disk at high speed, allowing NRRO in the write operation to be reduced. Therefore, the resultant frozen NRRO components are much smaller than those obtained as a result of performing an SSTW operation in an air atmosphere.

The effects of the present invention will be described below by comparing the results of reading burst data written in two different ways. One way was to write the servo data to the magnetic disk in a self servo track write (SSTW) operation in a conventional manner (that is, the SSTW operation was performed with the HDA filled with air). The other way was to write the servo data to the magnetic disk in an SSTW operation after replacing the atmosphere within the HDA with He according to the present invention.

Figure 10:
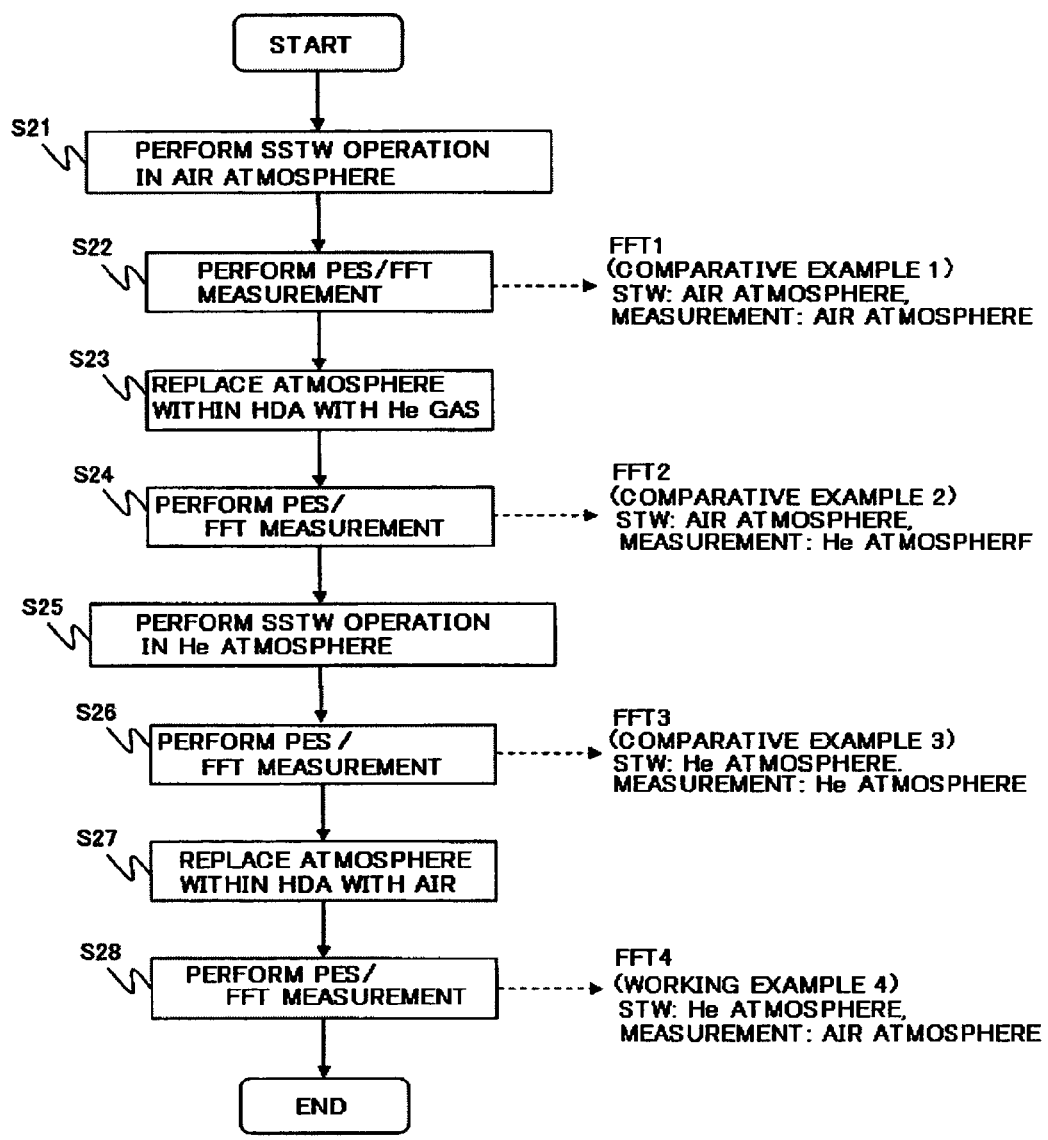
FIG. 10 is a flowchart illustrating a test procedure according to the embodiment of the present invention.
Figure 11:
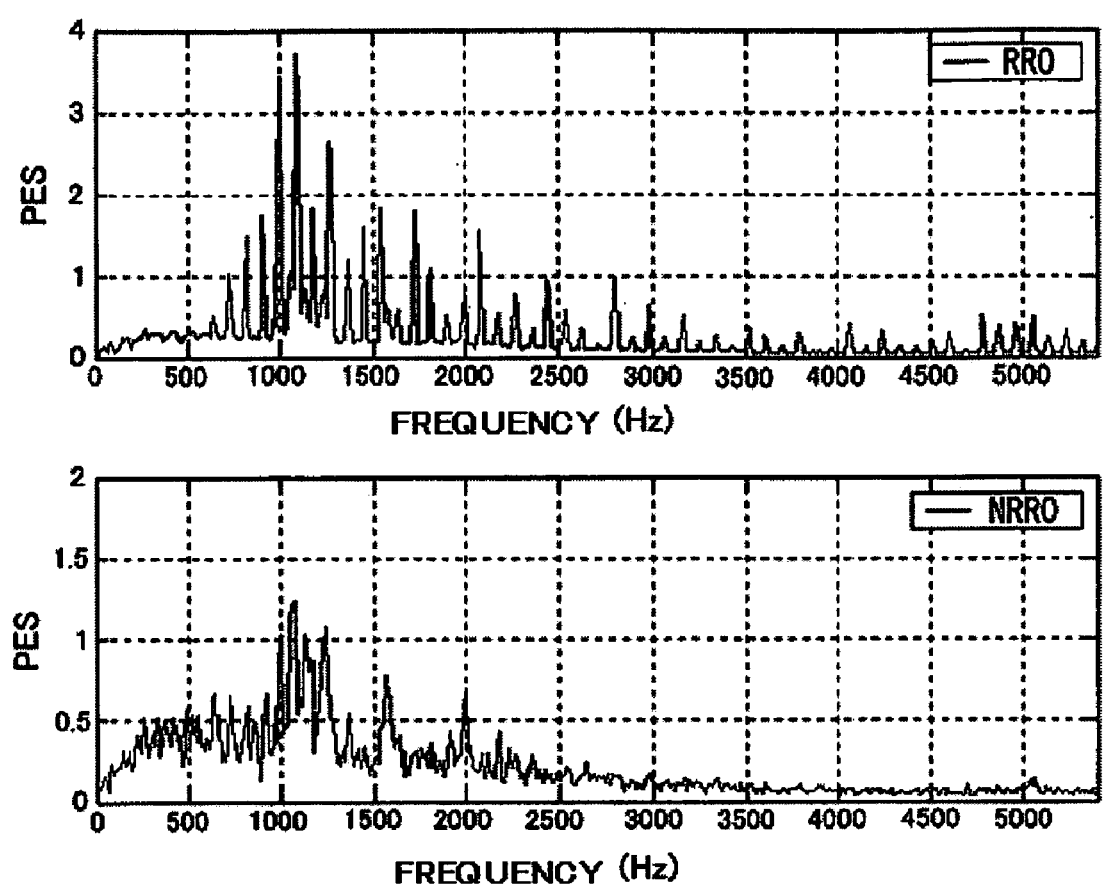
FIG. 11 is a graph showing RRO and NRRO determined based on an FFT1 measurement result obtained using the first head (head 0) in a HDD with a 2.5 inch disk rotating at 5400 rpm.
Figure 12:
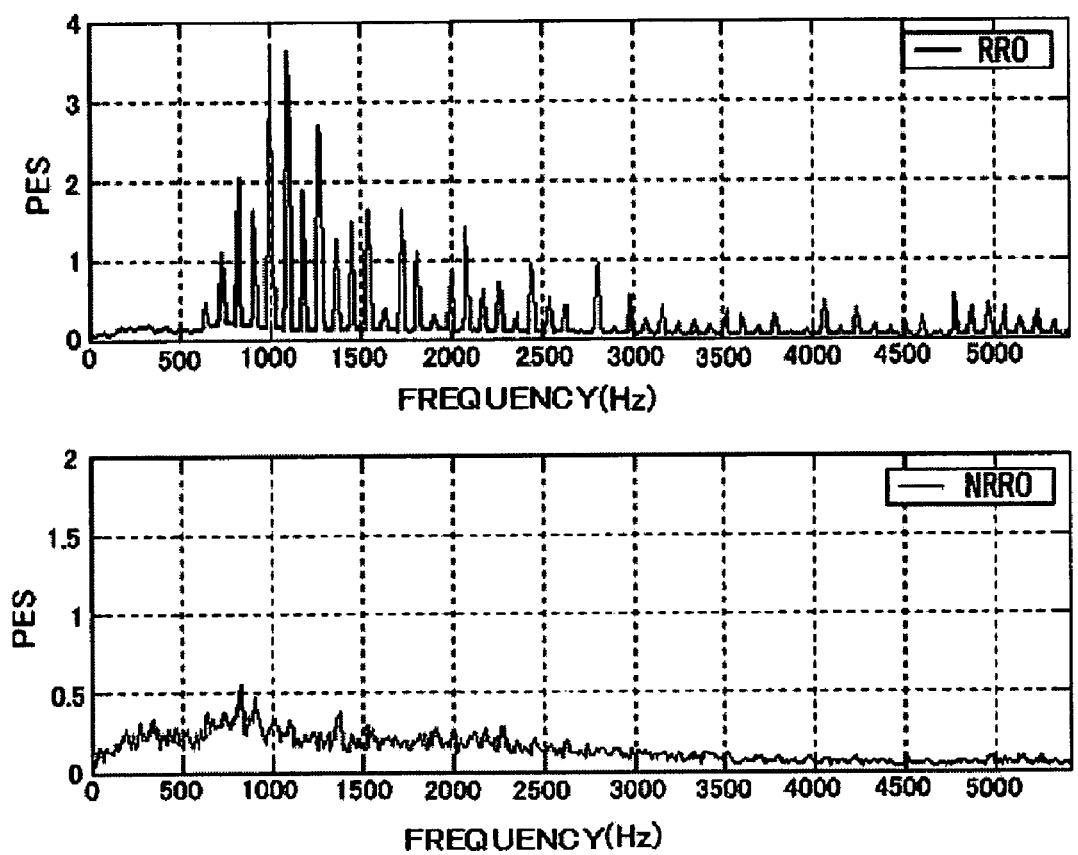
FIG. 12 is a graph showing RRO and NRRO determined based on an FFT 2 measurement result obtained using the first head (head 0).
Figure 13:
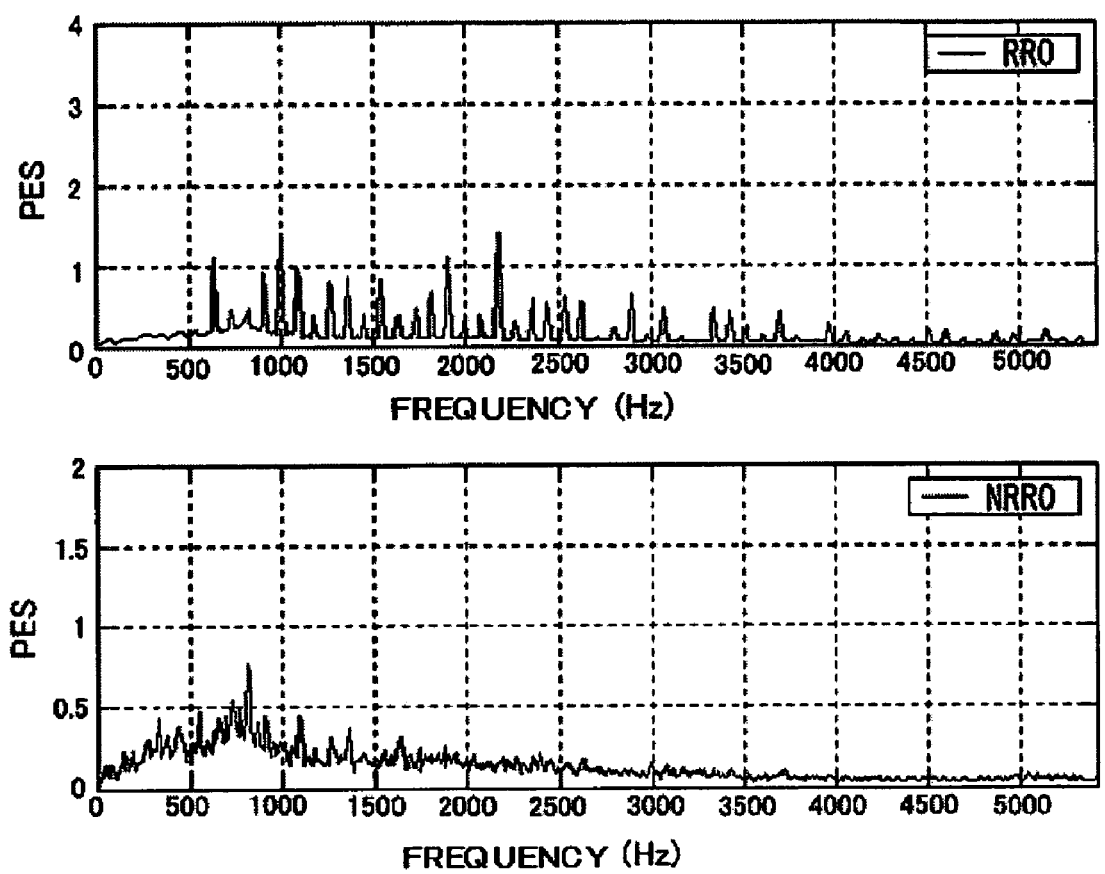
FIG. 13 is a graph showing RRO and NRRO determined based on an FFT3 measurement result obtained using the first head (head 0).
Figure 14:
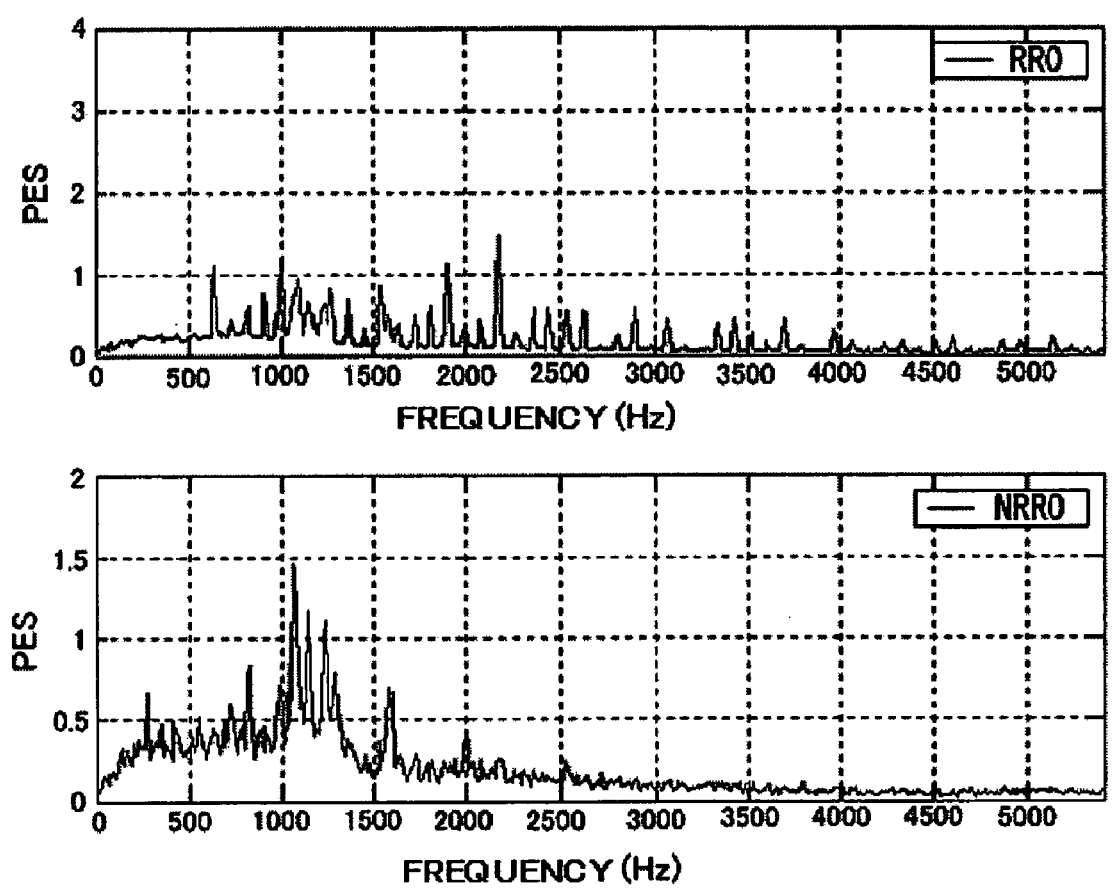
FIG. 14 is a graph showing RRO and NRRO determined based on an FFT4 measurement result obtained using the first head (head 0).
Figure 15:
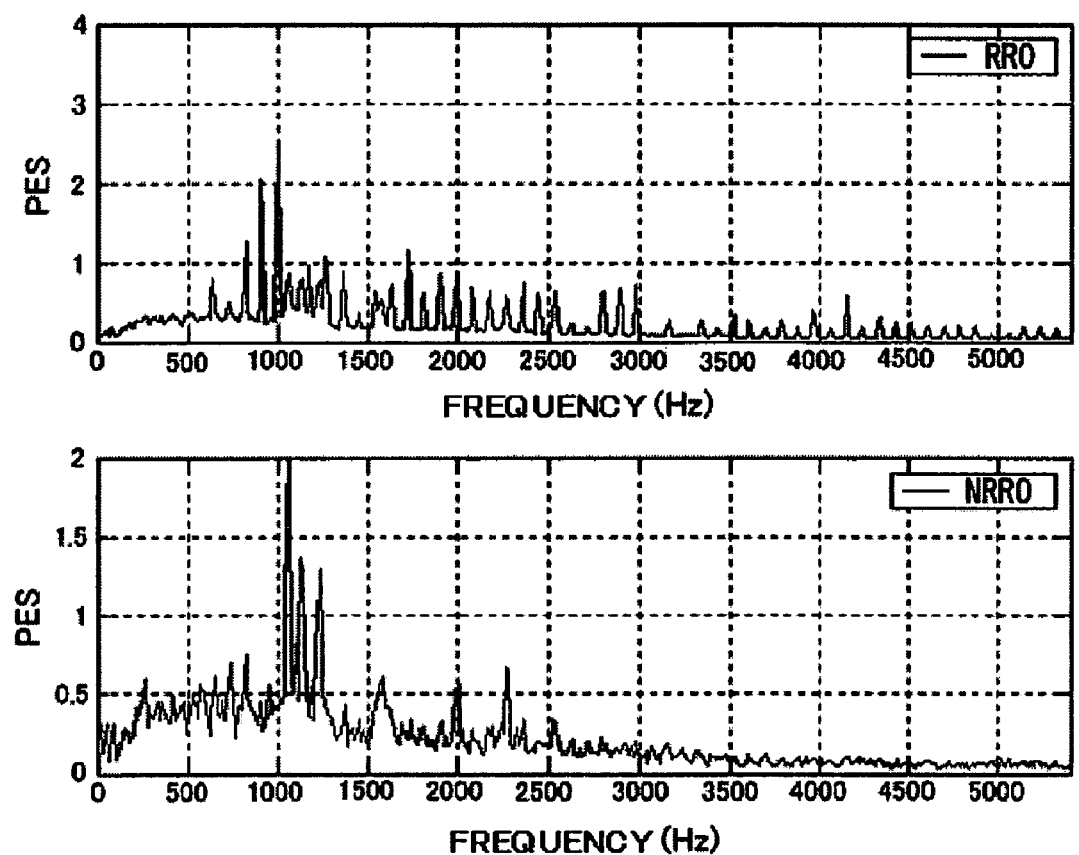
FIG. 15 is a graph showing RRO and NRRO determined based on an FFT1 measurement result obtained using the second head (head 1) in the HDD with a 2.5 inch disk rotating at 5400 rpm.
Figure 16:
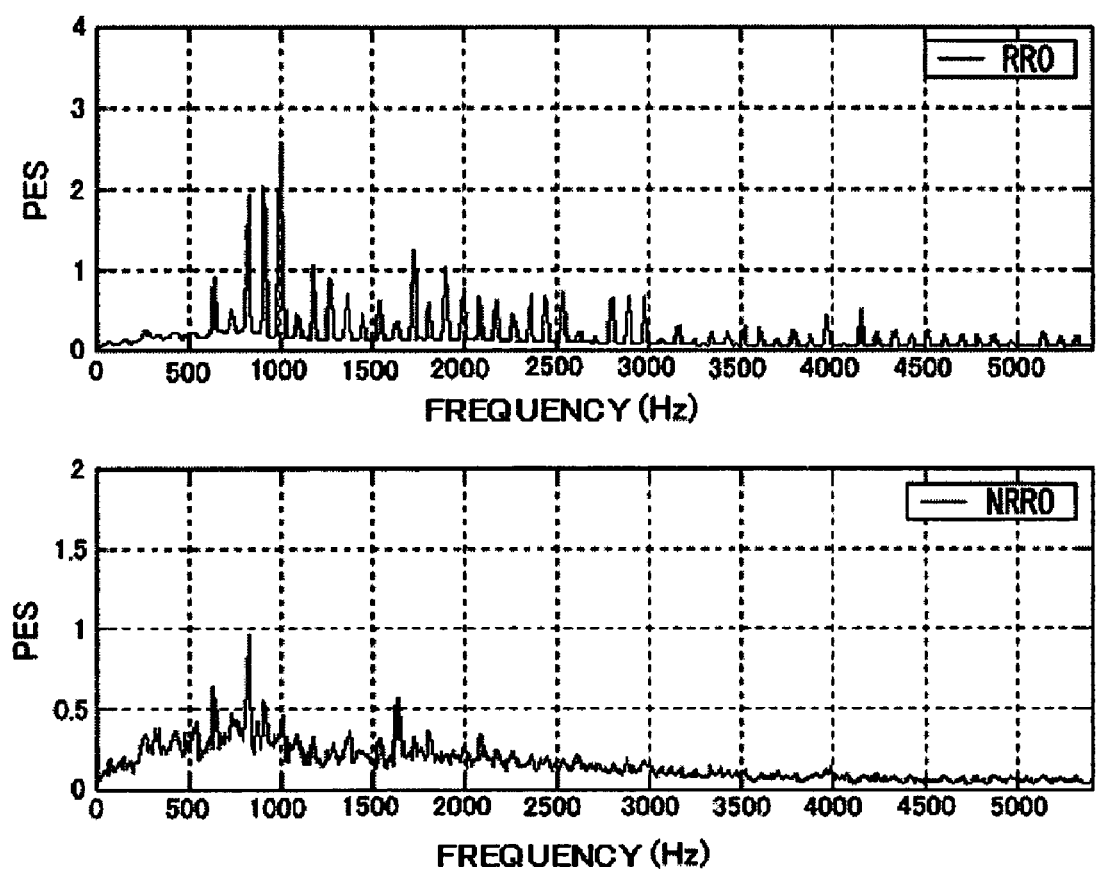
FIG. 16 is a graph showing RRO and NRRO determined based on an FFT2 measurement result obtained using the second head (head 1).
Figure 17:
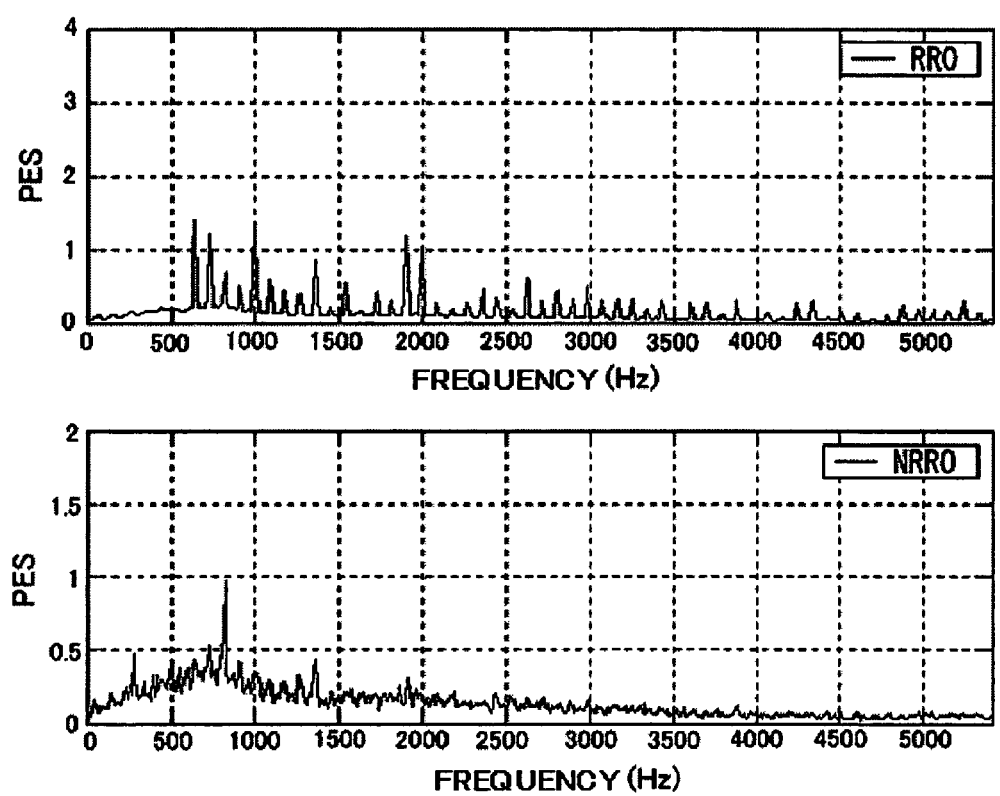
FIG. 17 is a graph showing RRO and NRRO determined based on an FFT3 measurement result obtained using the second head (head 1).
Figure 18:
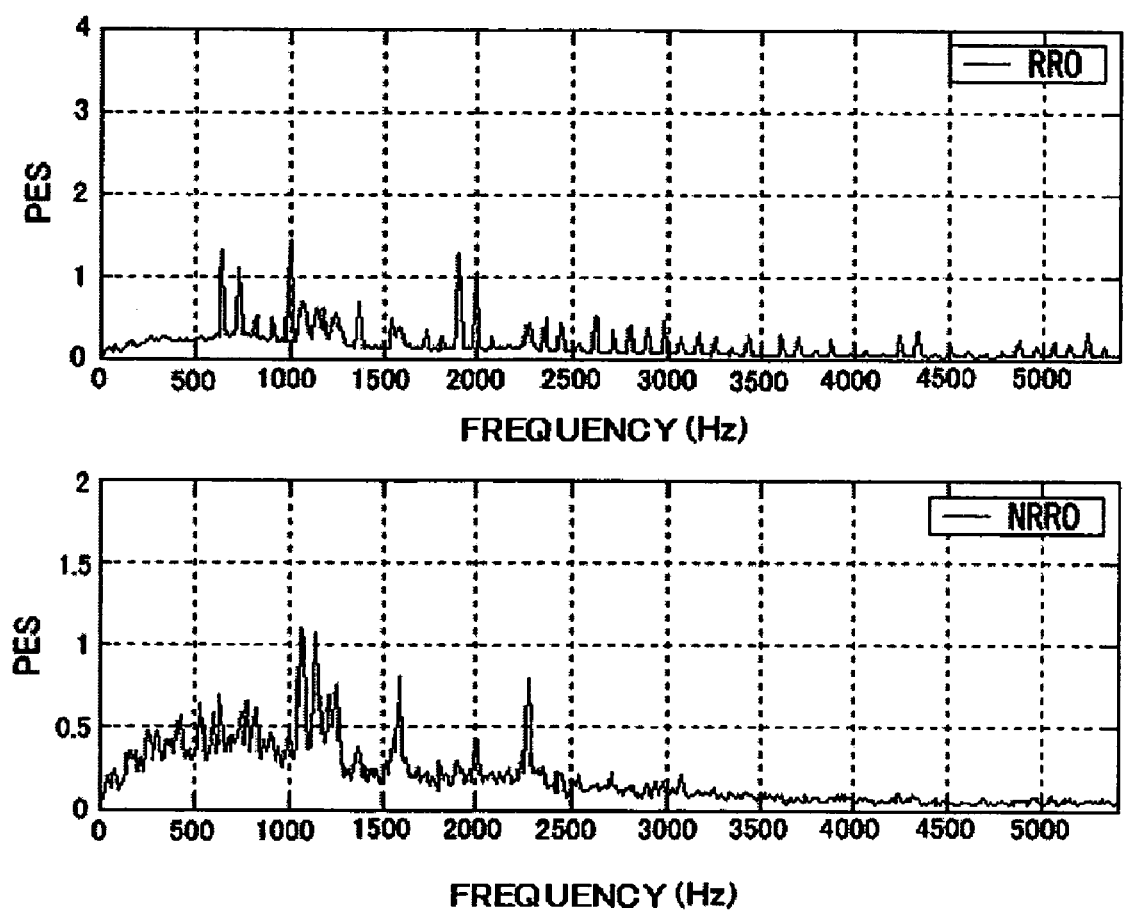
FIG. 18 is a graph showing RRO and NRRO determined based on an FFT4 measurement result obtained using the second head (head 1).
Figure 19:
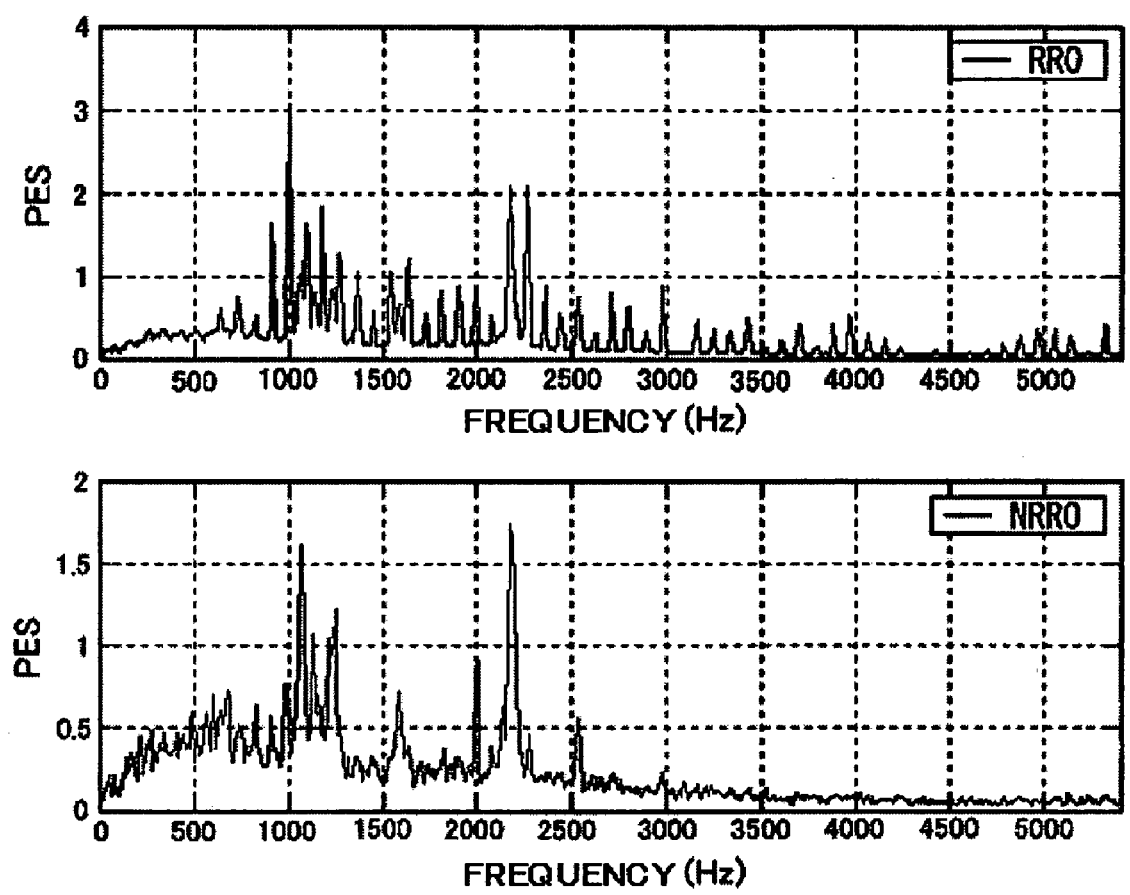
FIG. 19 is a graph showing RRO and NRRO determined based on an FFT1 measurement result obtained using the third head (head 2) in the HDD with a 2.5 inch disk rotating at 5400 rpm.
Figure 20:
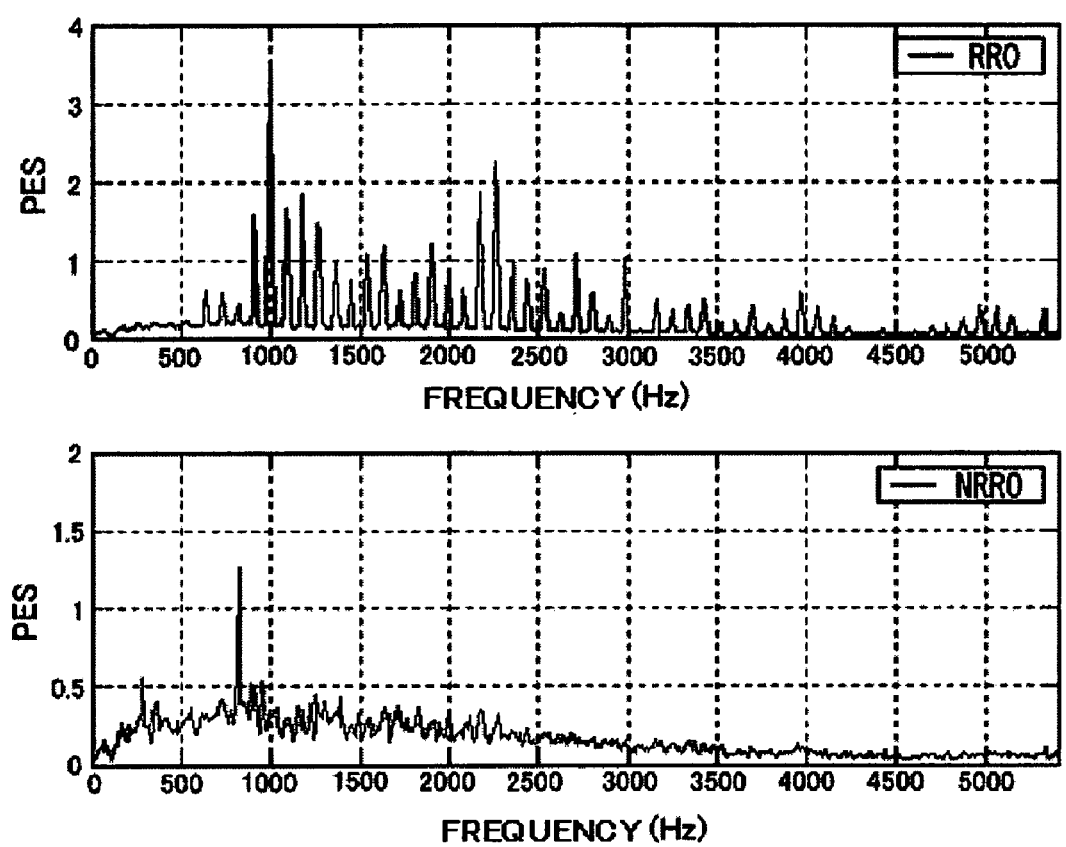
FIG. 20 is a graph showing RRO and NRRO determined based on an FFT2 measurement result obtained using the third head (head 2).
Figure 21:
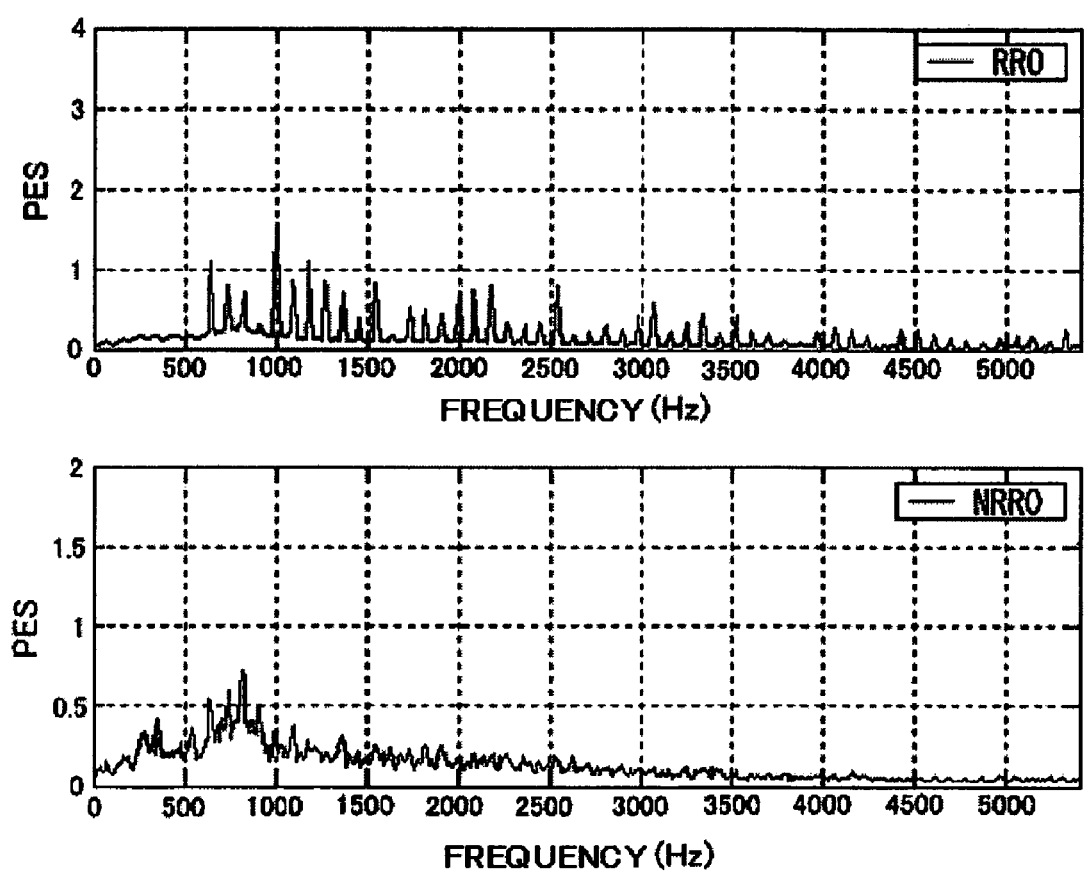
FIG. 21 is a graph showing RRO and NRRO determined based on an FFT3 measurement result obtained using the third head (head 2).
Figure 22:
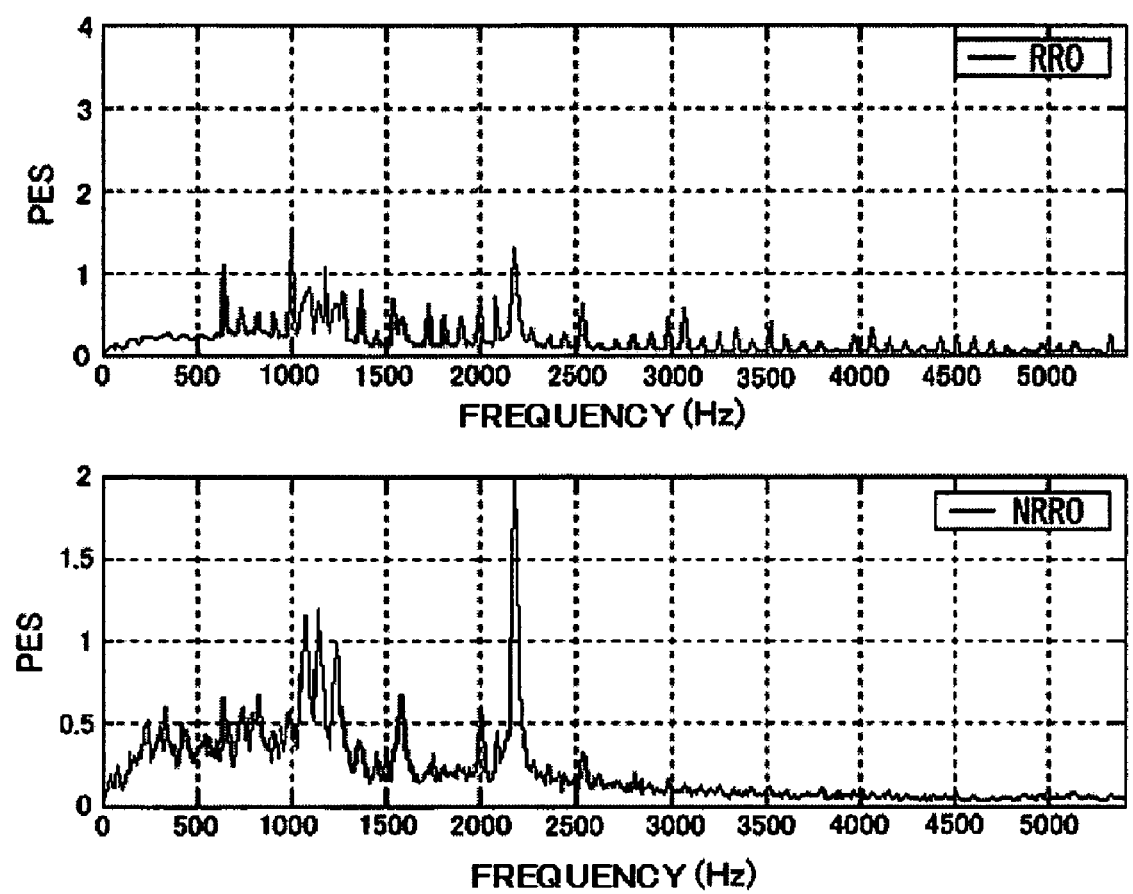
FIG. 22 is a graph showing RRO and NRRO determined based on an FFT4 measurement result obtained using the third head (head 2).
Figure 23:
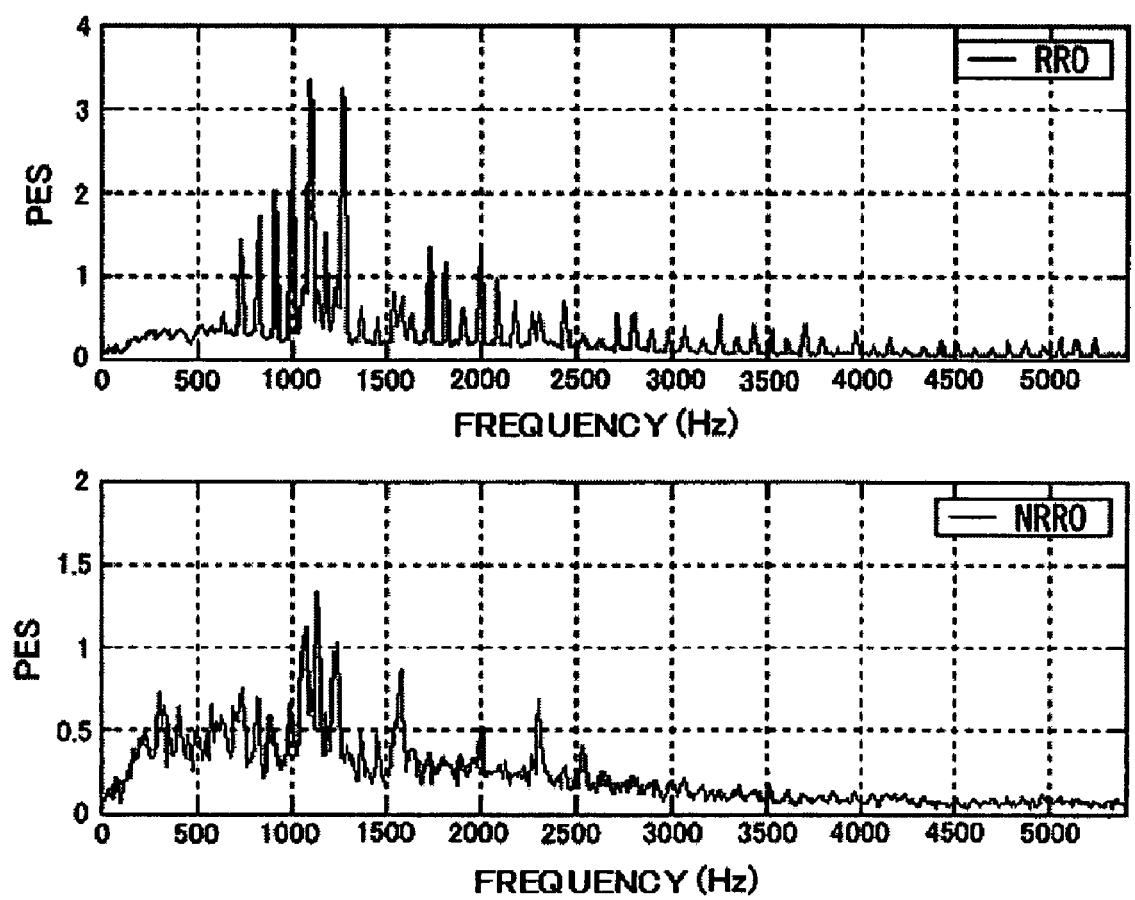
FIG. 23 is a graph showing RRO and NRRO determined based on an FFT1 measurement result obtained using the fourth head (head 3) in the HDD with a 2.5 inch disk rotating at 5400 rpm.
Figure 24:
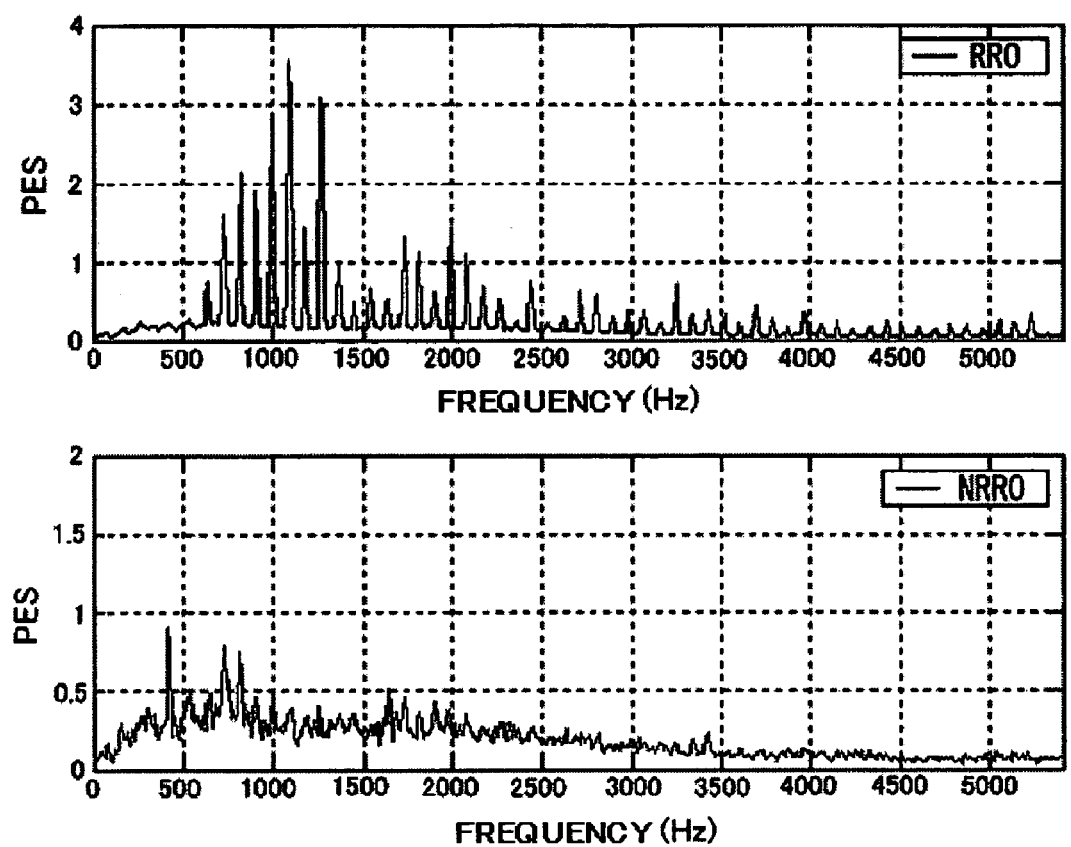
FIG. 24 is a graph showing RRO and NRRO determined based on an FFT2 measurement result obtained using the fourth head (head 3).
Figure 25:
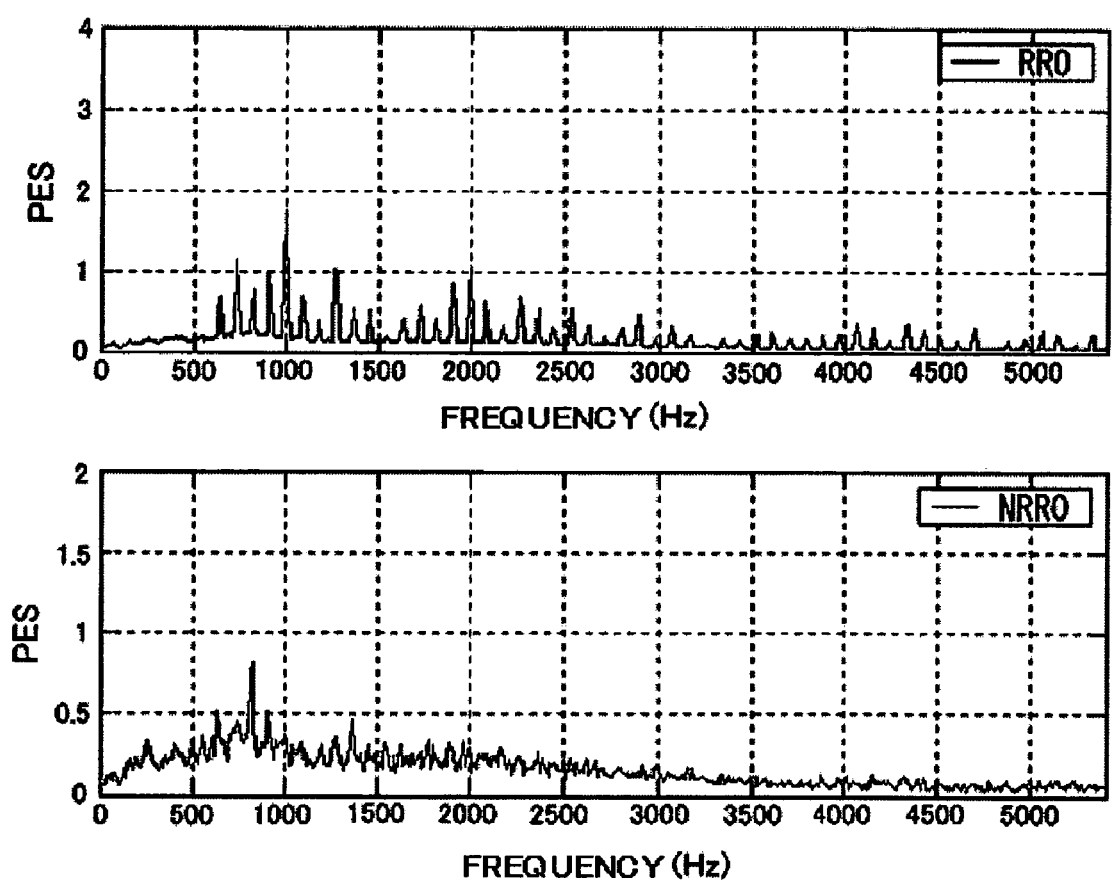
FIG. 25 is a graph showing RRO and NRRO determined based on an FFT3 measurement result obtained using the fourth head (head 3).
Figure 26:
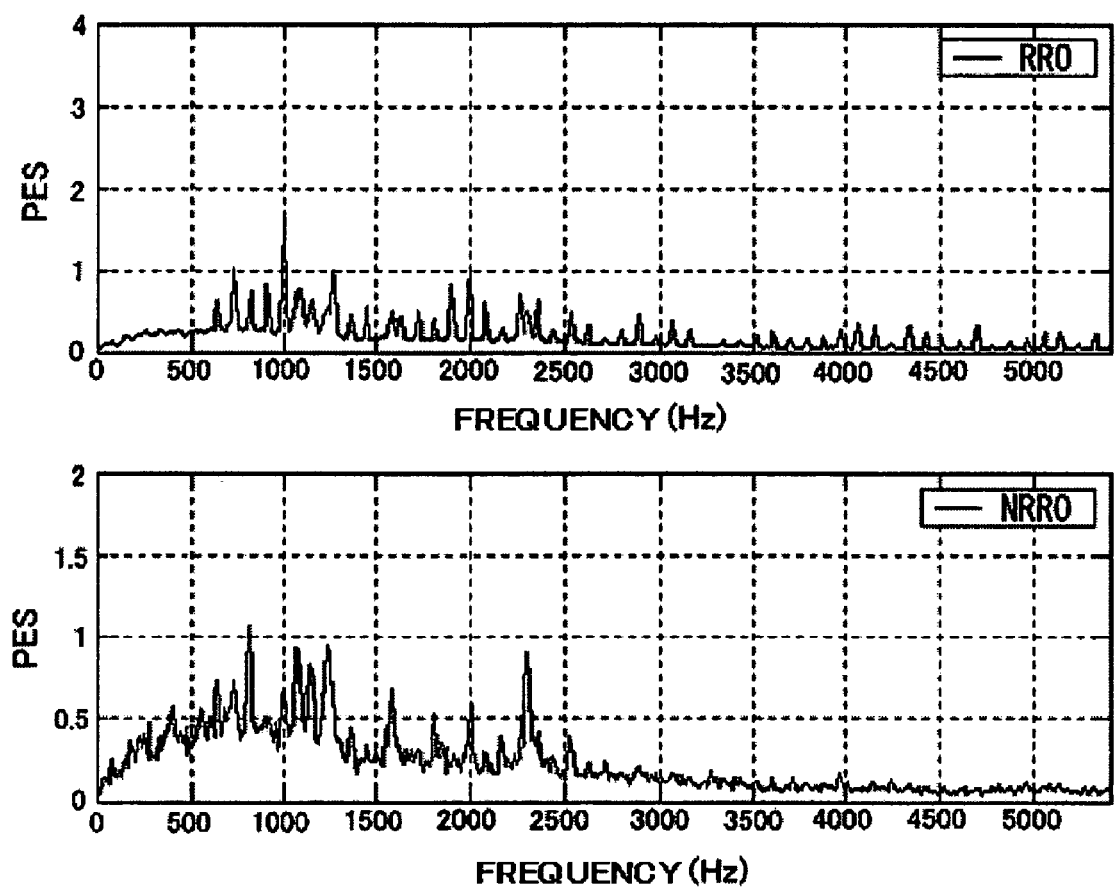
FIG. 26 is a graph showing RRO and NRRO determined based on an FFT4 measurement result obtained using the fourth head (head 3).

Specifically, we measured RRO and NRRO of servo data written on a 2.5 inch HDD by a conventional method and the method of the present invention. FIG. 10 is a flowchart illustrating the test procedure. The process begins by preparing a HDD assembled as a result of performing steps S1 to S4 shown in FIG. 5. Then, step S21 carries out a self servo track write (SSTW) operation on this HDD in a conventional manner. That is, the SSTW operation is performed in an air atmosphere. Then, step S22 performs FFT measurement on the position error signal (PES) generated based on the servo data (hereinafter referred to as "PES/FFT measurement"). The measurement result obtained at step S22 is hereinafter referred to as an "FFT1 measurement result" or "comparative example 1". In the PES/FFT measurement, PES information on a series of 1024 sectors is obtained 100 times.

Let us define the center position of a track to be the position at which the amplitudes of the bursts A and B balance each other. According to the present embodiment, the position error signal (PES) is calculated by the equation: PES=A/(A+B) (full scale=255), where A is the amplitude of the burst A, and B is the amplitude of the burst B. It should be noted that the position error signal (PES) may be calculated by the equation: PES=B/(A+B).

Then, step S23 replaces the atmosphere within the HDA with He. After that, step 24 performs PES/FFT measurement, as does step S22. The measurement result obtained at step S24 is hereinafter referred to as an "FFT2 measurement result" or "comparative example 2". Then, step S25 performs an SSTW operation in the He atmosphere according to the present embodiment. After that, step S26 performs PES/FFT measurement, as does step S22. The measurement result obtained at step S26 is hereinafter referred to as an "FFT3 measurement result" or "comparative example 3". Then, step S27 replaces the atmosphere within the HDA with air. After that, step S28 performs PES/FFT measurement. The measurement result obtained at step S28 is hereinafter referred to as an "FFT4 measurement result" or "working example".

The effects of the present invention will be described in detail based on FFT1 to FFT4 measurement results obtained using the above procedure. As described above, an FFT1 measurement result (comparative example 1) is obtained by performing the steps of: performing an STW operation in an air atmosphere, as is done conventionally; reading the servo data in the air atmosphere; and performing PES/FFT measurement. Further, an FFT2 measurement result (comparative example 2) is obtained by performing the steps of: performing an STW operation in an air atmosphere, as is done conventionally; replacing the air within the HDA with He; reading the servo data in the He atmosphere; and performing PES/FFT measurement. Further, an FFT3 measurement result (comparative example 3) obtained by performing the steps of: performing an STW operation in a He atmosphere according to the present invention; reading the servo data in the He atmosphere; and performing PES/FFT measurement. Still further, an FFT4 measurement result (working example) is obtained by performing the steps of: performing an STW operation in a He atmosphere according to the present invention; replacing the He within the HDA with air; reading the servo data in the air atmosphere; and performing PES/FFT measurement.

FIGS. 11 to 26 are diagrams showing RRO (repeatable runout) and NRRO (non-repeatable runout) obtained by the following method based on FFT1 to FFT4 measurement results obtained using a HDD with a 2.5 inch magnetic disk rotating at 5400 rpm. The results obtained are associated with the first to fourth heads (Head 0 to Head 3). The RRO was obtained as follows. In the above PES/FFT measurement, PES data was obtained from a series of 1024 sectors and subjected to fast Fourier transform (FFT). This processing was repeated 100 times for each track, and the measurement data obtained through the 100 measurement operations was averaged. The NRRO is obtained by subtracting the above averaged value (RRO) from the peak value of the measurement data obtained through the FFT processing. The servo pattern used for the PES/FFT measurement was a seamed servo pattern, and the PES/FFT measurement was carried out using a product card on the outer circumferential side of the magnetic disk.

FIGS. 11 to 26 each include two figures. In the upper figure, the horizontal axis represents the frequency of each frequency component of the position error signal (PES) obtained as a result of transforming the PES from the time domain to the frequency domain using FFT, and the vertical axis represents the magnitude of the RRO of each frequency component. It should be noted that the magnitude of the position error signal (PES) is calculated by the equation PES=A/(A+B), or the equation B/(A+B), where A is the amplitude of the burst A, and B is the amplitude of the burst B. In the lower figure, the horizontal axis also represents the frequency of each frequency component of the PES, but the vertical axis represents the magnitude of the NRRO of each frequency component. The RRO and NRRO are calculated as described above. FIGS. 11 to 14 respectively show (RRO and NRRO calculated from) FFT1 to FFT4 measurement results obtained using the first head (head 0); FIGS. 15 to 18 respectively show FFT1 to FFT4 measurement results obtained using the second head (head 1); FIGS. 19 to 22 respectively show FFT1 to FFT4 measurement results obtained using the third head (head 2); and FIGS. 23 to 26 respectively show FFT1 to FFT4 measurement results obtained using the fourth head (head 3).

Comparing the FFT1 measurement results (comparative examples 1) in FIGS. 11, 15, 19, and 23 with the FFT4 measurement results (working examples) in FIGS. 14, 18, 22, and 26, respectively, reveals the following. In each FFT1 measurement result, the average value (RRO) of the magnitude of each PES frequency component obtained as a result of Fourier-transforming the PES obtained from a predetermined number of read signals of servo data is substantially equal to the difference (NRRO) between the maximum magnitude value and the RRO of the PES frequency component. In each FFT4 measurement result, on the other hand, the RRO is smaller than the NRRO at every frequency; especially, the RRO has been dramatically reduced at around 1 to 2 kHz.

The RRO components at around 1 to 2 kHz are frozen NRRO caused predominantly by a magnetic disk flutter mode and a vibration called torque noise which are greatly influenced by the air resistance to the head and the disk when servo data is written.

Vibrations due to such flutter are significant at around 1 to 2 kHz. These vibrations appear not only when a track is written in an STW process, but also when data is read from the product. Even though the product employs a servo system, it is not possible to eliminate these errors (vibrations). The total error has a magnitude equal to the sum of the squares of the magnitudes of the error (e1) written into the servo data and corresponding to the frozen NRRO and the error (e2) due to the NRRO in the read operation. The present embodiment, however, performs an STW operation in an atmosphere of a gas having a low density, such as He, and thereby considerably reduces the gas resistance to the head and the disk when servo data is written, which makes it possible to reduce the error (e1) written into the servo data and corresponding to the frozen NRRO by, for example, approximately one half, resulting in a dramatic reduction in the total error.

It should be noted that the NRRO is significantly reduced in the FFT2 measurement results (comparative examples 2) shown in FIGS. 12, 16, 20, and 24 and the FFT3 measurement results (comparative examples 3) shown in FIGS. 13, 17, 21, and 25. This is because the servo data was read in a He atmosphere. Reading servo data in a He atmosphere considerably reduces the gas resistance to the head and the magnetic disk in the read operation, thereby considerably reducing the NRRO. That is, the FFT2 and FFT3 measurement results indicate that if servo data is read in a He atmosphere, the NRRO is small, whether the STW operation was carried out in an air atmosphere (as is done conventionally) or in a He atmosphere (according to the invention). On the other hand, if servo data is read in an air atmosphere, the NRRO is large, whether the STW operation was carried out according to a conventional method or according to the present invention. This means that NRRO decreases with decreasing gas resistance to the disk and the head in the read operation, that is, with decreasing specific gravity of the gas within the HDA.

Incidentally, in the case of the servo track writer system, which performs an STW operation on a separate medium, the RRO can be made smaller than the NRRO since the flutter in the write operation can be reduced by fixing the arm with a push pin or somehow reducing the flutter of the magnetic disk itself. In an SSTW operation, however, since the HDD 100 writes servo data by itself, it is not possible to externally reduce the flutter of the arm and the magnetic disk. Therefore, in this case, the RRO is equal to or larger than the NRRO (if the SSTW operation is performed in a conventional manner), as indicated by each FFT1 measurement result.

On the other hand, if the SSTW operation is performed according to the present embodiment (i.e., in an atmosphere of a low density gas), the RRO is reduced and hence is smaller than the NRRO, as indicated by each FFT4 measurement result. It should be noted that the magnitude of NRRO greatly depends on the read atmosphere; it does not depend on the write atmosphere, as described later. Therefore, the FFT1 and FFT4 measurement results show substantially the same NRRO value. Most of the RRO components in the FFT4 measurement results which are smaller than the corresponding RRO components in the FFT1 measurement results are frozen NRRO reduced as a result of replacing the air atmosphere with the He atmosphere. Therefore, the RRO in each FFT4 measurement is considered to be mostly ordinary RRO synchronous with the rotation of the spindle motor. Especially, the peaks at around 1 to 2 kHz in the FFT1 measurement results are frozen NRRO attributed primarily to NRRO occurring due to the influence of a flutter mode, and have been considerably reduced in the FFT4 measurement results, which are obtained by performing the SSTW operation in a He atmosphere.

Unlike ordinary RRO synchronous with the rotation of the spindle motor, frozen NRRO is difficult to handle, for example, difficult to remove from a read signal, since its phase is different in different tracks. For servo track writers (not for SSTW), techniques have been proposed for reducing and stabilizing the air resistance to the magnetic disk and the head so as to prevent a flutter mode from occurring. These techniques, however, cannot sufficiently reduce frozen NRRO. If frozen NRRO occurs, the track pitch is partially narrowed or widened, as shown in FIG. 9, reducing the head positioning accuracy. On the other hand, the present embodiment writes servo data in a He atmosphere to reduce frozen NRRO, allowing the RRO to be reduced by approximately one half, as indicated by the FFT4 measurement results in which the magnitude of the RRO is one-half of that of the RRO in the FFT1 measurement results. With this arrangement, it is possible to prevent the track pitch from varying, thereby dramatically increasing the positioning accuracy.

Further, NRRO obtained as a result of performing PES/FFT measurement in a He atmosphere is small (approximately one-half of NRRO obtained as a result of performing PES/FFT measurement in an air atmosphere), as indicated by the FFT2 and FFT3 measurement results. However, the method of the present invention replaces the He within the HDA with air after performing the STW operation. If the method performs a read operation without replacing the He within the HDA with air, the resultant NRRO value is small, as indicated by the FFT2 and FFT3 measurement results. Thus, performing a read operation with the HDA filled with He produces reduced NRRO. However, to accomplish this on the user side, it is necessary to ship a hermetically sealed HDD filled with He, requiring special measures to be taken so that no problem arises when humidity or temperature changes. If the He escapes from the HDD, performance degradation results, which might lead to a serious defect. Furthermore, it may be necessary or preferable to collect the gas in the HDD from the viewpoint of environmental problems.

Specifically, when the HDD is hermetically sealed, if ambient temperature outside of the drive decreases, the humidity within the drive increases, which may lead to dew formation. On the other hand, if ambient temperature outside of the drive increases, the pressure within the drive increases, which might lead to malfunction, etc. Further, the inspection process next to the STW process inspects the HDD filled with He, aiming to inspect the HDD in the same conditions as those on the user side. However, the gas may escape from the HDD while it is used by a user. This means that the HDD is used in conditions different from those in the inspection process. For example, the magnitude of the NRRO may increase by a factor of approximately 2, as indicated by the FFT1 and FFT4 measurement results, which may lead to failure to produce the desired performance. On the other hand, according to the present embodiment, the HDA is filled with He only during the STW process. After performing the STW process, the present embodiment replaces the atmosphere within the HDA with air, allowing the HDD to be inspected in the same conditions as those on the user side, which leads to accurate inspection. Furthermore, with this arrangement, it is not necessary to hermetically seal the HDD nor to take special measures so that no problem arises when humidity or temperature changes. Further, the problem of gas leakage, which may lead to performance degradation, does not possibly occur. When the He within the HDA is replaced with air after the STW process, the discharged He may be collected for recycling, as necessary.

NRRO obtained as a result of performing PES/FFT measurement in a He atmosphere is smaller than that obtained as a result of performing PES/FFT measurement in an air atmosphere, as indicated by the FFT2 and FFT3 measurement results. This fact may be used to determine whether the atmosphere within the HDA has been replaced with He or whether the HDA is in a sealed state. As described above, HDDs generally do not have a hermetically sealed structure since they are provided with a test hole for a particle count test and a vent for adjusting the internal gas pressure so that it matches the atmospheric pressure. However, these HDDs must be maintained in a sealed state for a few hours in the STW process. In other words, they need to be in a hermetically sealed state only for a few hours in the STW process. Therefore, the present embodiment introduces He into the HDA after sealing the test hole (also used as a vent) and the vent for adjusting the internal pressure, which is very easy to perform. Measured NRRO values may be used to determine whether the HDA has been filled with He and is in a hermetically sealed state during the STW process.

The NRRO values in the FFT2 and FFT3 measurement results may be used to determine whether the atmosphere within the HDA was replaced with He and the He atmosphere was maintained during the STW process. That is, after the STW process, if the NRRO obtained as a result of performing PES/FFT measurement is substantially equal in magnitude to that in the FFT1 measurement results, it indicates that the atmosphere within the HDA was not replaced with He. If, on the other hand, the NRRO is small and substantially equal in magnitude to those in the FFT2 and FFT3 measurement results, it indicates that the atmosphere within the HDA was replaced with He and the He atmosphere was maintained. After an STW process, the present inventors have performed PES/FFT measurements to see how the NRRO changes in time and found that the He atmosphere within the HDA can be maintained (that is, the HDA can be maintained in a hermetically sealed state) if for a few tens of hours. That is, even though the method of the present invention is simple, it can maintain the HDA in a hermetically sealed state if for a few hours or so, which is the time period required for the STW process.

Further, PES/FFT measurements may also be performed to determine how long it takes for the air within the HDA to be replaced with He. Specifically, to replace the atmosphere within the HDA with He, He is introduced into the HDA at an appropriate flow rate so that the gas pressure within the HDA can be kept constant. During this process, PES/FFT measurements are performed to determine the (shortest) time it takes for the NRRO to become substantially equal to that in the FFT2 or FFT3 measurement results. This time period corresponds to the time required to fully replace the atmosphere (air) within the HDA with He. Further, the time required to fully replace the atmosphere (He) within the HDA with air can also be obtained in the same manner. For example, the present inventors were able to replace the air within the HDA with He in one minute or so.

A description will be given below of results of measurements performed on a 3.5 inch HDD. Wind disturbance due to the rotation has larger influence on 3.5 inch HDDs than on 2.5 inch HDDs since disks in the 3.5 inch HDDs are larger in diameter than those in 2.5 inch HDDs. Therefore, the present invention has a large effect on 3.5 inch HDDs. Further, the higher the rotational speed, the larger the influence of the flutter due to the air resistance and hence the larger the effect produced by the present invention.

Figure 27:
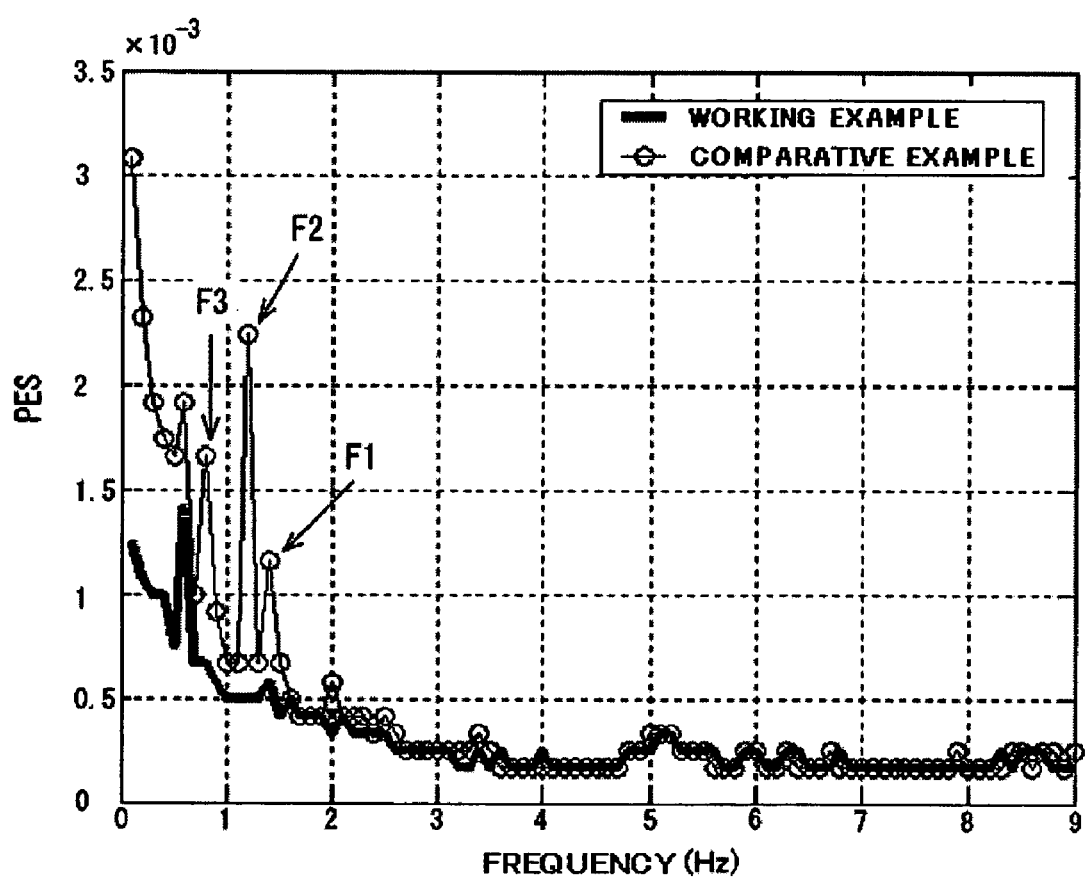
FIG. 27 is a graph showing the amplitude value of a servo data read signal generated by a TMR head in a HDD with a 3.5 inch disk rotating at 6300 rpm.
Figure 28:
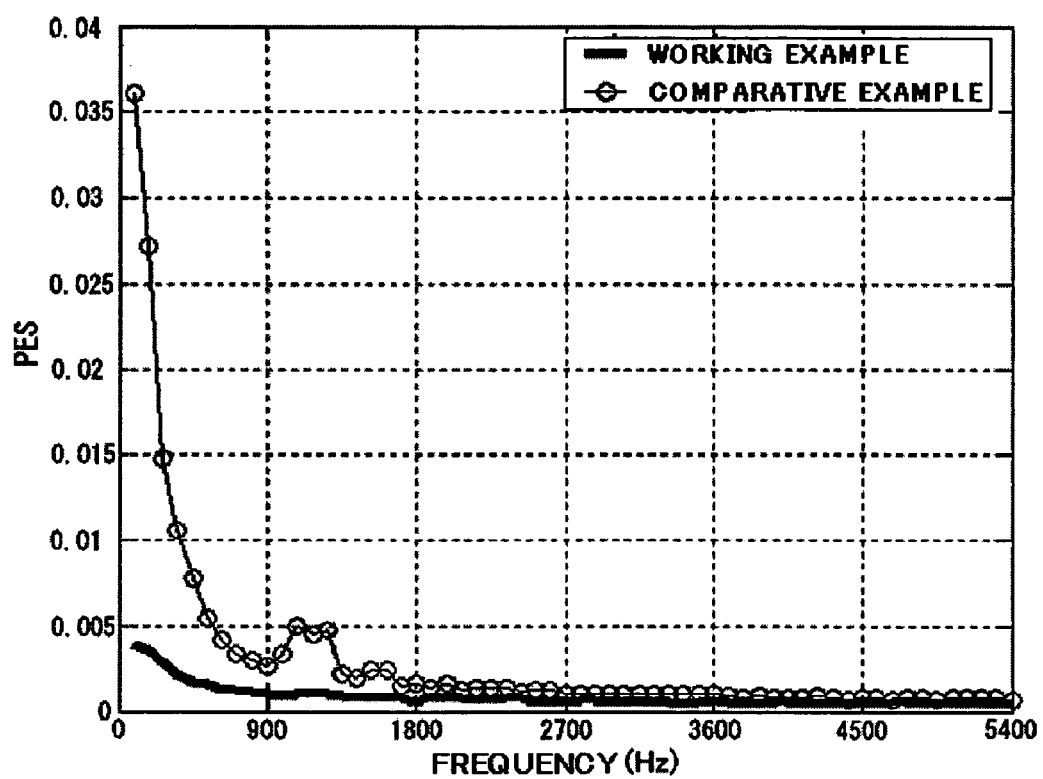
FIG. 28 is a graph showing the results of measurement of the gap between seamless servo patterns in a radial direction in the HDD with a 3.5 inch disk rotating at 6300 rpm.

FIGS. 27 and 28 are diagrams showing results of measurements performed on a HDD with a 3.5 inch disk rotating at 6300 rpm. In the figures, the thick line indicates the results of reading servo data written in an SSTW operation in a He atmosphere according to the present invention, while the thin line indicates the results of reading servo data written in an SSTW operation in an air atmosphere. Specifically, in both cases, an SSTW card is used to perform PES/FFT measurements on a seamless servo pattern written in a self servo track write (SSTW) operation.

FIG. 27 is a graph showing the magnitude of each PES frequency component obtained as a result of FFT-transforming the PES of a read signal generated by a GMR (tunneling magneto resistive) head when the full scale is 1. F1 to F3 indicate runout attributed to disk flutter. The large noises at frequencies up to 600 Hz are runout attributed to torque noise. In the results of measurements on the servo data written in a conventional manner (a comparative example indicated by the thin line), the noises at low frequencies (that is, noises due to disk flutter indicated by F1 to F3) are significant, as compared with those in the results of measurements on the servo data written in a He atmosphere according to the present invention (a working example). The measurement results shown in FIG. 27 were obtained using an SSTW card, as described above. The runout components indicated by F1 to F3 are NRRO which occurred when the servo data was written. As shown in the figure, these runout components have been significantly reduced in the measurement results (working example) indicated by the thick line.

Further, as described above, in the case of seamless servo patterns, a gap is formed between each two neighboring servo patterns. Therefore, a change (squeeze) in the track width may be measured based on a change in the size of the gap. That is, if the track width does not change, the gap size is constant. If, on the other hand, the track width changes, so does the gap size. Therefore, changes in the track width can be measured by measuring the size of the gap. FIG. 28 shows the results of measurements of changes in the track width. Specifically, the changes in the track width were determined based on the value of the expression (A+B)/C or the expression (A+B)/D, where A to D denote the amplitudes of the bursts A to D, respectively. The measured data is subjected to FFT processing to obtain each frequency component. In FIG. 28, the vertical axis represents the magnitude of each frequency component.

In the case of seamless servo patterns, if the center of the track is set at the position at which the bursts A and B balance each other, a gap is formed between them. This is because the width of the write head is smaller than the width of the track. Therefore, the value of the expression (A+B)/C changes as the size of the gap between the bursts A and B changes. This means that changes in the track width can be determined based on this value. It should be noted that since the width of the read head is smaller than the width of the burst C, the width of the burst C is regarded as being equal to the width of the read head. Therefore, the value of the expression (A+B)/C indicates the size of the gap with respect to the read head. It should be further noted that the magnitude of each frequency component obtained based on the expression (A+B)/D may be plotted on the vertical axis. Further, it is assumed that the gain is adjusted such that the value of the expression (A+B)/C for a reference track is set to a predetermined value.

In FIG. 28, the comparative example (reading servo data written in a conventional manner) indicated by the thin line exhibits large changes in the gap at low frequencies up to 2 kHz, as in FIG. 27, indicating that the influence of a flutter mode is significant. These changes in the gap are attributed to NRRO which occurred when servo data was written, as in the case shown in FIG. 27. In contrast, the working example (reading servo data written according to the present invention) indicated by the thick line shows that the influence of the flutter mode have been substantially removed at low frequencies.

Figure 29:
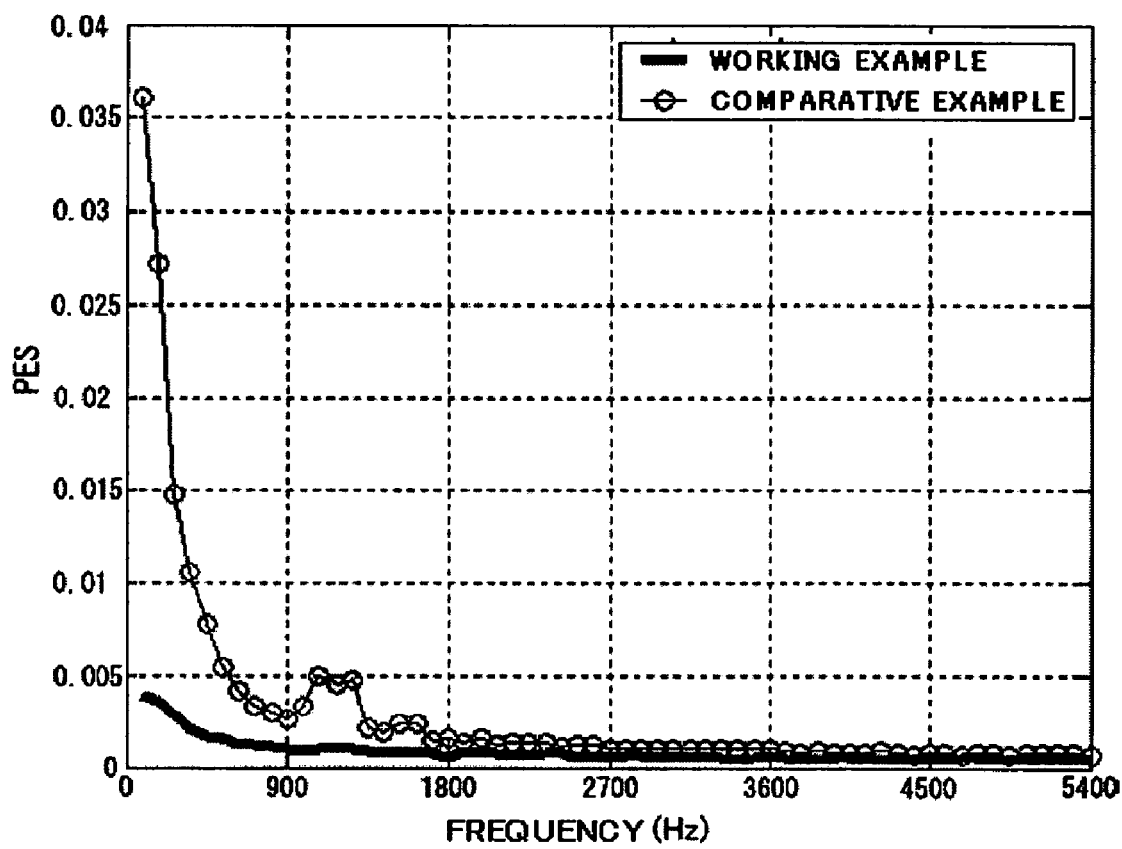
FIG. 29 is a graph showing the amplitude value of a servo data read signal generated by a TMR head in a HDD with a 2.5 inch disk rotating at 5400 rpm.
Figure 30:
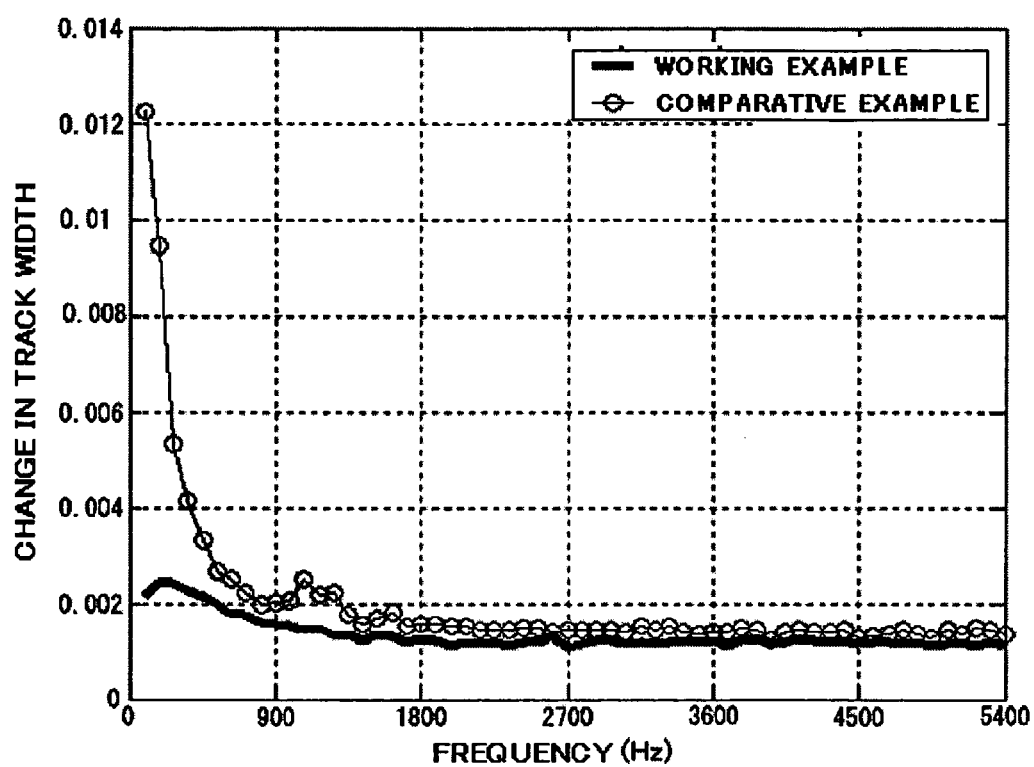
FIG. 30 is a graph showing the results of measurements of changes in the track width in the HDD with a 2.5 inch disk rotating at 5400 rpm.

FIGS. 29 and 30, which correspond to FIGS. 27 and 28 respectively, are diagrams showing results of measurements on a seamed servo pattern for a HDD with a 2.5 inch disk rotating at 5400 rpm. It should be noted that in this case, an SSW burst pattern was written in the SSTW operation separately from the servo data used by the HDD product to position its head. The burst pattern for the product is written while reading this SSW burst pattern. The SSTW burst pattern is written without being trimmed, whether the burst pattern for the product is a seamless servo pattern or a seamed servo pattern. Therefore, the SSTW device can measure the value of the above expression (A+B)/C, which indicates a change in the track width. The working example and the comparative example in each figure correspond respectively to the FFT4 measurement results shown in FIGS. 14, 18, 22, and 26 and the FFT1 measurement results shown in FIGS. 11, 15, 19, and 23. While the measurement results shown in FIGS. 11 to 26 were obtained using a product card (that is, the measurements were performed on servo data read by the HDD product), the measurement results shown in FIGS. 29 and 30 were obtained using a self servo track writer. However, also in this case, noise components at around 1 to 2 kHz have been removed, whether in the PES or in the track width change (squeeze).

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A method for manufacturing a disk device including a disk, a head for writing/reading data to/from said disk, a drive unit for driving said disk and said head, and an enclosure containing said disk, said head, and said drive unit, said method comprising:
   mounting said disk, said head, and said drive unit in said enclosure;
   replacing air within said enclosure with a gas having a lower density than said air;
   sealing said enclosure;
   subsequent to sealing said enclosure, writing servo data to said disk in a self servo track write operation;
   unsealing said enclosure; and
   replacing said gas within said enclosure with air.

2. The method as claimed in claim 1, wherein said gas is an inert gas or a mixed gas consisting of an inert gas and air.

3. The method as claimed in claim 1, wherein said gas is helium, hydrogen, a mixed gas consisting of helium and air, or a mixed gas consisting of hydrogen and air.

4. The method as claimed in claim 1, wherein replacing said air within said enclosure with said gas includes discharging said air while introducing said gas into said enclosure.

5. The method as claimed in claim 1, wherein replacing said air within said enclosure with said gas includes discharging said air while introducing said gas through a test hole for a particle count test provided on said enclosure.

6. The method as claimed in claim 5, wherein replacing said air within said enclosure with said gas further includes inserting a tube into said test hole and introducing said gas through said tube, said tube being smaller in diameter than said test hole.

7. The method as claimed in claim 1, wherein replacing said air within said enclosure with said gas includes discharging said air while introducing said gas through a vent provided on said enclosure.

8. The method as claimed in claim 7, wherein replacing said air within said enclosure with said gas further includes discharging said air through a second vent provided on said enclosure while introducing said gas through a first vent provided on said enclosure.

9. The method as claimed in claim 8, wherein replacing said gas within said enclosure with said air includes discharging said gas through said first vent while introducing said air through said second vent.

10. The method as claimed in claim 8, wherein said first vent is provided on a top side of said enclosure, and said second vent is provided on a bottom side of said enclosure.

11. The method as claimed in claim 8, wherein said first vent and said second vent are diagonally disposed on said enclosure.

12. The method as claimed in claim 7, wherein replacing said gas within said enclosure with said air includes leaving said vent open to the atmosphere.

13. The method as claimed in claim 1, wherein replacing said air with said gas is performed at a substantially constant pressure in said enclosure.

14. The method as claimed in claim 1, wherein replacing said gas with said air is performed at a substantially constant pressure in said enclosure.

15. The method as claimed in claim 1, further comprising performing a first measurement on a a position error signal (PES) generated based on the servo data written in an environment of said gas.

16. The method as claimed in claim 15, further comprising:
   performing a second measurement on a position error signal (PES) generated based on the servo data written in an environment of air; and
   comparing the first and second measurements to determine whether the air within said enclosure has been replaced with the gas.

17. A method for manufacturing a disk device including a disk, a head for writing/reading data to/from said disk, a drive unit for driving said disk and said head, and an enclosure containing said disk, said head, and said drive unit, said method comprising:
   mounting said disk, said head, and said drive unit in said enclosure;
   replacing air within said enclosure with a gas having a lower density than said air;

writing servo data to said disk in a self servo track write operation; and replacing said gas within said enclosure with air, wherein replacing said air within said enclosure with said gas includes discharging said air while introducing said gas through a test hole for a particle count test provided on said enclosure.

18. The method as claimed in claim 17, wherein replacing said air within said enclosure with said gas further includes inserting a tube into said test hole and introducing said gas through said tube, said tube being smaller in diameter than said test hole.

19. The method as claimed in claim 17, wherein replacing said air within said enclosure with said gas further includes discharging said air through a vent provided on said enclosure while introducing said gas through the test hole.

20. The method as claimed in claim 19, wherein replacing said gas within said enclosure with said air includes discharging said gas through said test hole while introducing said air through said vent.

21. The method as claimed in claim 19, wherein said test hole is provided on a top side of said enclosure, and said vent is provided on a bottom side of said enclosure.

22. The method as claimed in claim 19, wherein said test hole and said vent are diagonally disposed on said enclosure.

* * * * *